(12) United States Patent
Narroschke et al.

(10) Patent No.: US 10,659,809 B2
(45) Date of Patent: May 19, 2020

(54) EFFICIENT ROUNDING FOR DEBLOCKING

(71) Applicant: Sun Patent Trust, New York, NY (US)

(72) Inventors: Matthias Narroschke, Schaafheim (DE); Anand Kotra, Frankfurt (DE); Semih Esenlik, Nazilli (TR); Thomas Wedi, The Hague (NL)

(73) Assignee: SUN PATENT TRUST, New York, NY (US)

( * ) Notice: Subject to any disclaimer, the term of this patent is extended or adjusted under 35 U.S.C. 154(b) by 0 days.

(21) Appl. No.: 16/160,461

(22) Filed: Oct. 15, 2018

(65) Prior Publication Data
US 2019/0052895 A1    Feb. 14, 2019

Related U.S. Application Data

(60) Continuation of application No. 15/661,176, filed on Jul. 27, 2017, now Pat. No. 10,148,979, which is a
(Continued)

(51) Int. Cl.
*H04N 19/105* (2014.01)
*H04N 19/117* (2014.01)
(Continued)

(52) U.S. Cl.
CPC ........ *H04N 19/55* (2014.11); *H04N 19/105* (2014.11); *H04N 19/117* (2014.11); *H04N 19/124* (2014.11); *H04N 19/13* (2014.11); *H04N 19/14* (2014.11); *H04N 19/15* (2014.11); *H04N 19/174* (2014.11); *H04N 19/182* (2014.11); *H04N 19/44* (2014.11); *H04N 19/46* (2014.11);
(Continued)

(58) Field of Classification Search
CPC ....................................................... H04N 19/55
USPC ............................................................ 375/240
See application file for complete search history.

(56) References Cited

U.S. PATENT DOCUMENTS

2011/0103490 A1   5/2011  Kuo
2011/0194614 A1   8/2011  Norkin et al.
(Continued)

FOREIGN PATENT DOCUMENTS

TW    201116064    5/2011
WO    02/096117   11/2002
(Continued)

OTHER PUBLICATIONS

Frank Bossen, "Common test conditions and software reference configurations", Joint Collaborative Team on Video Coding (JCT-VC) of ITU-T SG16 WP3 and ISO/IEC JTC1/SC29/WG11, JCTVC-E700, 4th Meeting: Daegu, KR, Jan. 20-28, 2011, (http://phenix.int-evry.fr/jct/doc_end_user/current_document.php?id=2454).
(Continued)

*Primary Examiner* — Christopher S Kelley
*Assistant Examiner* — Asmamaw G Tarko
(74) *Attorney, Agent, or Firm* — Wenderoth, Lind & Ponack, L.L.P.

(57) ABSTRACT

The present disclosure relates to deblocking filtering which is applicable to smoothing the block boundaries in an image or video coding and decoding. In particular, the deblocking filtering is either strong or weak, wherein the clipping is performed differently in the strong filtering and the weak filtering.

2 Claims, 32 Drawing Sheets

Related U.S. Application Data division of application No. 15/336,912, filed on Oct. 28, 2016, now Pat. No. 9,749,654, which is a continuation of application No. 14/803,257, filed on Jul. 20, 2015, now Pat. No. 9,503,749, which is a division of application No. 14/496,099, filed on Sep. 25, 2014, now Pat. No. 9,118,925, which is a continuation of application No. 14/264,084, filed on Apr. 29, 2014, now Pat. No. 9,083,978, which is a continuation of application No. PCT/EP2012/071748, filed on Nov. 2, 2012.

(60) Provisional application No. 61/555,181, filed on Nov. 3, 2011.

(51) Int. Cl.

| | | |
|---|---|---|
| *H04N 19/124* | (2014.01) | |
| *H04N 19/13* | (2014.01) | |
| *H04N 19/55* | (2014.01) | |
| *H04N 19/593* | (2014.01) | |
| *H04N 19/44* | (2014.01) | |
| *H04N 19/14* | (2014.01) | |
| *H04N 19/182* | (2014.01) | |
| *H04N 19/174* | (2014.01) | |
| *H04N 19/80* | (2014.01) | |
| *H04N 19/82* | (2014.01) | |
| *H04N 19/86* | (2014.01) | |
| *H04N 19/46* | (2014.01) | |
| *H04N 19/15* | (2014.01) | |
| *H04N 19/61* | (2014.01) | |
| *H04N 19/176* | (2014.01) | |
| *H04N 19/184* | (2014.01) | |

(52) U.S. Cl.
CPC ........... *H04N 19/593* (2014.11); *H04N 19/61* (2014.11); *H04N 19/80* (2014.11); *H04N 19/82* (2014.11); *H04N 19/86* (2014.11); *H04N 19/176* (2014.11); *H04N 19/184* (2014.11)

(56) References Cited

U.S. PATENT DOCUMENTS

2013/0101031 A1* 4/2013 Van der Auwera .... H04N 19/14
375/240.12

2013/0259120 A1* 10/2013 Van der Auwera .........................
H04N 19/00096
375/240.03
2014/0112396 A1* 4/2014 Ikeda ................... H04N 19/117
375/240.29

FOREIGN PATENT DOCUMENTS

| WO | 2011/096869 | 8/2011 |
| WO | 2012/096610 | 7/2012 |
| WO | 2013/001957 | 1/2013 |
| WO | 2013/052835 | 4/2013 |

OTHER PUBLICATIONS

Thomas Wiegand et al., "WD3: Working Draft 3 of High-Efficiency Video Coding", Joint Collaborative Team on Video Coding (JCT-VC) of ITU-T SG16 WP3 and ISO/IEC JTC1/SC29/WG11, JCTVC-E603, 5th Meeting: Geneva, CH, Mar. 16-23, 2011.
Tomoo Yamakage et al., "CE12: Deblocking filter parameter adjustment in slice level", Joint Collaborative Team on Video Coding (JCT-VC) of ITU-T SG16 WP3 and ISO/IEC JTC1/SC29/WG11, JCTVC-F143, 6th Meeting: Torino, Jul. 14-22, 2011.
Benjamin Bross et al., "High efficiency video coding (HEVC) text specification draft 9", Joint Collaborative Team on Video Coding (JCT-VC) of ITU-T SG16 WP3 and ISO/IEC JTC1/SC29/WG11, JCTVC-K1003, 11th Meeting: Shaghai, CN, Oct. 10-19, 2012.
Benjamin Bross et al., "WD4: Working Draft 4 of High-Efficiency Video Coding", Joint Collaborative Team on Video Coding (JCT-VC) of ITU-T SG16 WP3 and ISO/IEC JTC1/SC29/WG11, JCTVC-F803_d5, Ver.7, 6th Meeting: Torino, IT, Jul. 14-22, 2011.
International Search Report dated Jan. 16, 2013 in International (PCT) Application No. PCT/EP2012/071748.
Written Opinion of the International Searching Authority dated Jan. 16, 2013 in International (PCT) Application No. PCT/EP2012/071748.
Notice of Allowance dated Feb. 27, 2015 in parent U.S. Appl. No. 14/264,084.
Office Action dated Jul. 21, 2017 along with a search report in corresponding Taiwanese Patent Application No. 105137646 with partial English translation.
Office Action dated Aug. 2, 2019 in corresponding European Patent Application No. 12791448.9.
Van der Auwera et al., "JCTVC-F556: SDIP Harmonization With Deblocking, HE Residual Coding", Joint Collaborative Team on Video Coding, 6th Meeting, Jul. 2011.

\* cited by examiner

| $i$ | $i+8$ | $(i+8) >> 4$ |
|---|---|---|
| −20 | −12 | −1 |
| −19 | −11 | −1 |
| −18 | −10 | −1 |
| −17 | −9 | −1 |
| −16 | −8 | −1 |
| −15 | −7 | −1 |
| −14 | −6 | −1 |
| −13 | −5 | −1 |
| −12 | −4 | −1 |
| −11 | −3 | −1 |
| −10 | −2 | −1 |
| −9 | −1 | −1 |
| −8 | 0 | 0 |
| −7 | 1 | 0 |
| −6 | 2 | 0 |
| −5 | 3 | 0 |
| −4 | 4 | 0 |
| −3 | 5 | 0 |
| −2 | 6 | 0 |
| −1 | 7 | 0 |
| 0 | 8 | 0 |
| 1 | 9 | 0 |
| 2 | 10 | 0 |
| 3 | 11 | 0 |
| 4 | 12 | 0 |
| 5 | 13 | 0 |
| 6 | 14 | 0 |
| 7 | 15 | 0 |
| 8 | 16 | 1 |
| 9 | 17 | 1 |
| 10 | 18 | 1 |
| 11 | 19 | 1 |
| 12 | 20 | 1 |
| 13 | 21 | 1 |
| 14 | 22 | 1 |
| 15 | 23 | 1 |
| 16 | 24 | 1 |
| 17 | 25 | 1 |
| 18 | 26 | 1 |
| 19 | 27 | 1 |
| 20 | 28 | 1 |

Problem: Unsymmetry

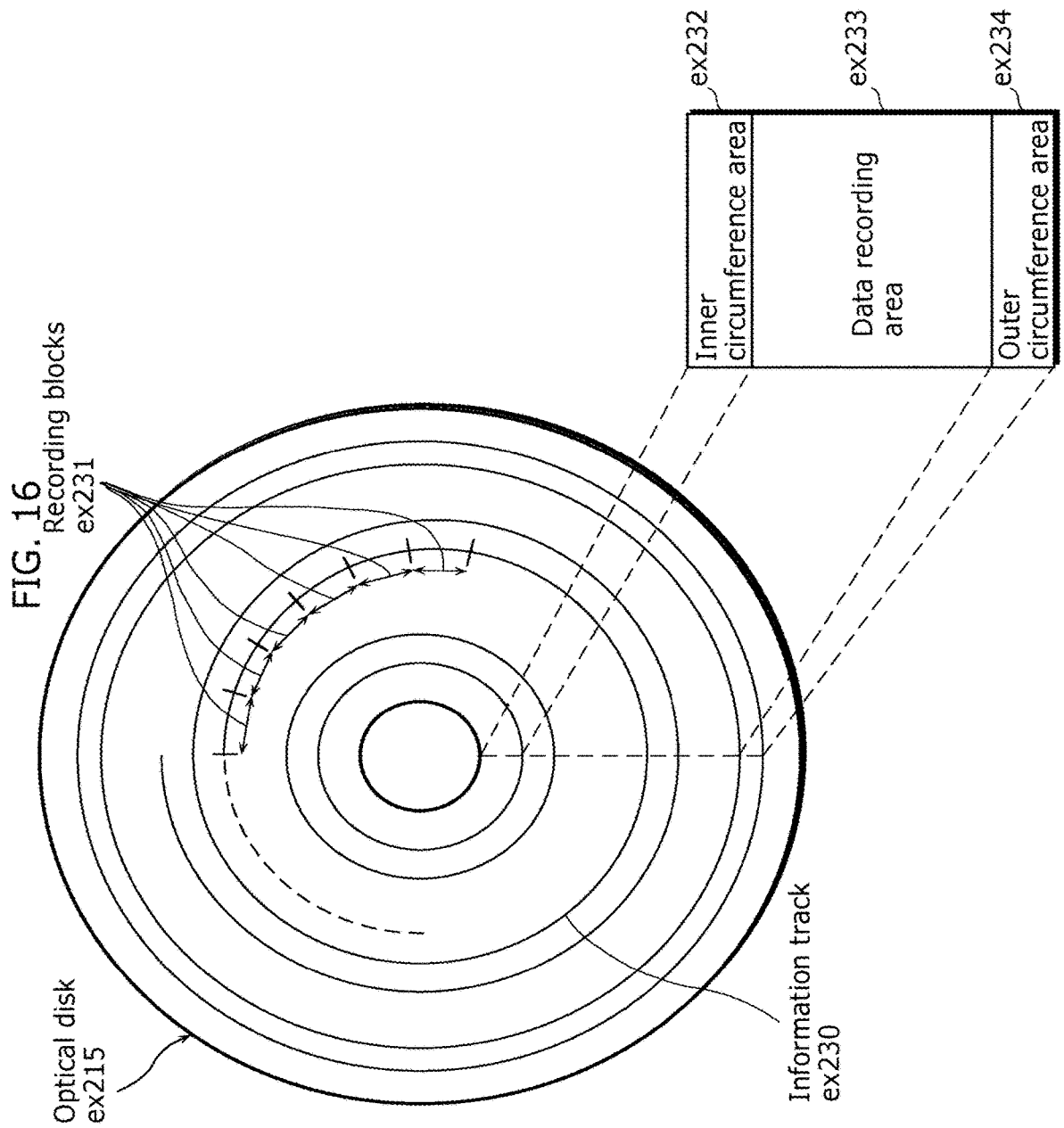

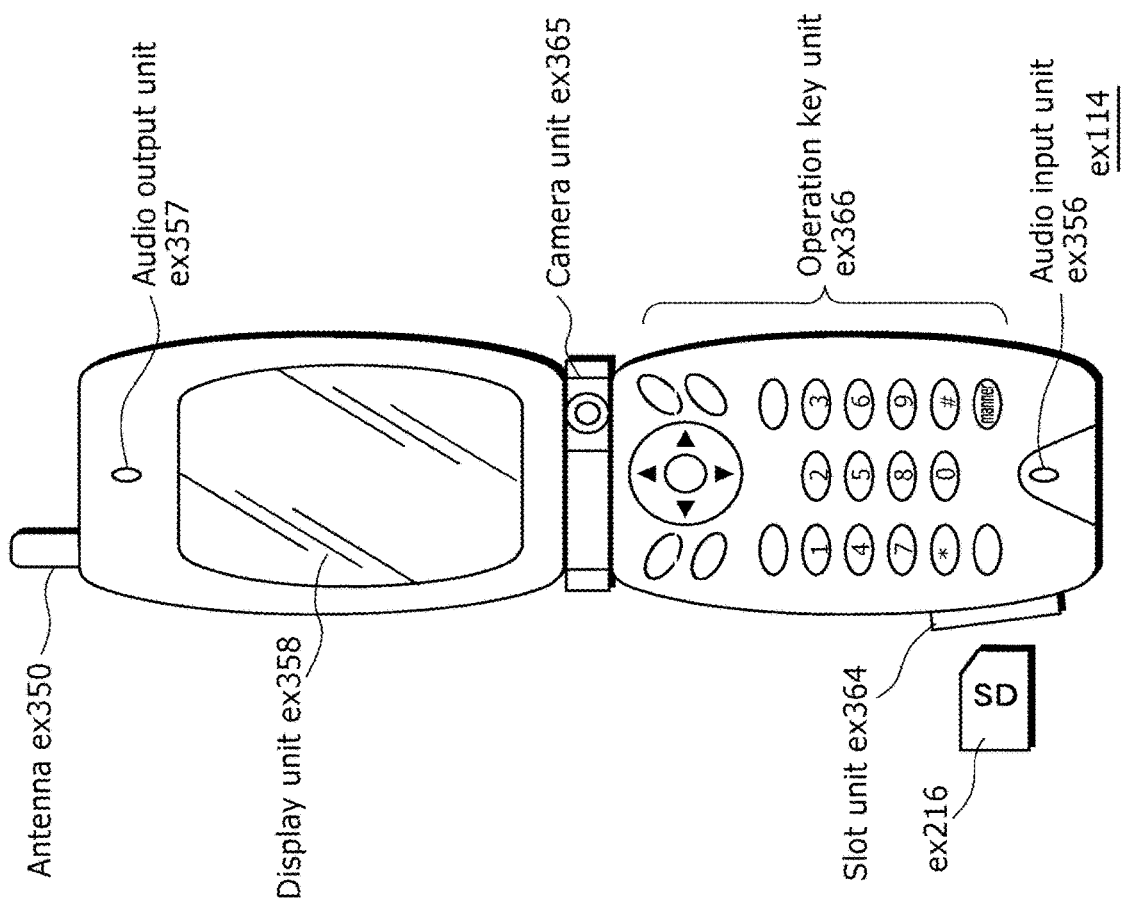

FIG. 18

| Video stream (PID=0x1011, Primary video) | Audio stream (PID=0x1100) | Audio stream (PID=0x1101) | Presentation graphics stream (PID=0x1200) | Presentation graphics stream (PID=0x1201) | Interactive graphics stream (PID=0x1400) | Video stream (PID=0x1B00, Secondary video) | Video stream (PID=0x1B01, Secondary video) |

FIG. 29

| Corresponding standard | Driving frequency |
|---|---|
| MPEG-4 AVC | 500 MHz |
| MPEG-2 | 350 MHz |
| ... | ... |

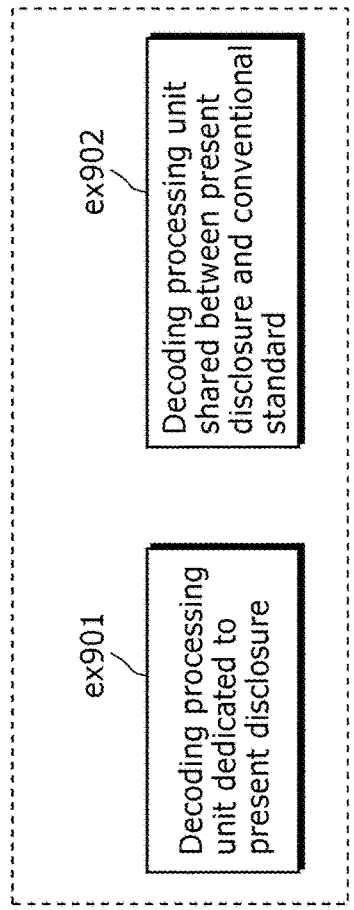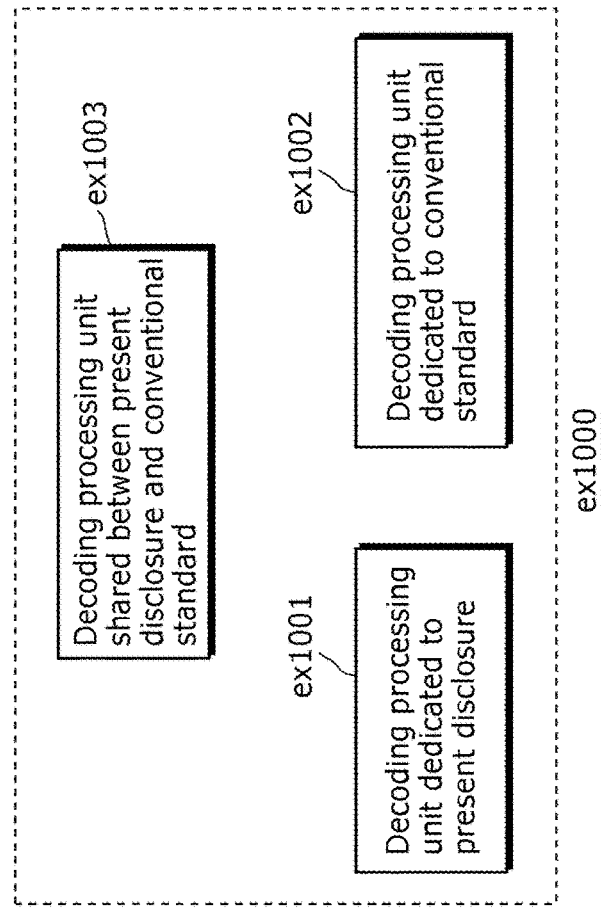

EFFICIENT ROUNDING FOR DEBLOCKING

FIELD

One or more exemplary embodiments disclosed herein relate to the filtering of images, and particularly to deblocking filtering and to rounding employed in the deblocking filtering operations.

BACKGROUND

At present, the majority of standardized video coding algorithms are based on hybrid video coding. Hybrid video coding methods typically combine several different lossless and lossy compression schemes in order to achieve the desired compression gain. Hybrid video coding is also the basis for ITU-T standards (H.26x standards such as H.261, H.263) as well as ISO/IEC standards (MPEG-X standards such as MPEG-1, MPEG-2, and MPEG-4). The most recent and advanced video coding standard is currently the standard denoted as H.264/MPEG-4 advanced video coding (AVC) which is a result of standardization efforts by joint video team (JVT), a joint team of ITU-T and ISO/IEC MPEG groups. This codec is being further developed by Joint Collaborative Team on Video Coding (JCT-VC) under a name High-Efficiency Video Coding (HEVC), aiming, in particular at improvements of efficiency regarding the high-resolution video coding.

A video signal input to an encoder is a sequence of images called frames, each frame being a two-dimensional matrix of pixels. All the above-mentioned standards based on hybrid video coding include subdividing each individual video frame into smaller blocks consisting of a plurality of pixels. The size of the blocks may vary, for instance, in accordance with the content of the image. The way of coding may be typically varied on a per block basis. The largest possible size for such a block, for instance in HEVC, is 64×64 pixels. It is then called the largest coding unit (LCU). In H.264/MPEG-4 AVC, a macroblock (usually denoting a block of 16×16 pixels) was the basic image element, for which the encoding is performed, with a possibility to further divide it in smaller subblocks to which some of the coding/decoding steps were applied.

Typically, the encoding steps of a hybrid video coding include a spatial and/or a temporal prediction. Accordingly, each block to be encoded is first predicted using either the blocks in its spatial neighborhood or blocks from its temporal neighborhood, i.e. from previously encoded video frames. A block of differences between the block to be encoded and its prediction, also called block of prediction residuals, is then calculated. Another encoding step is a transformation of a block of residuals from the spatial (pixel) domain into a frequency domain. The transformation aims at reducing the correlation of the input block. Further encoding step is quantization of the transform coefficients. In this step the actual lossy (irreversible) compression takes place. Usually, the compressed transform coefficient values are further compacted (losslessly compressed) by means of an entropy coding. In addition, side information necessary for reconstruction of the encoded video signal is encoded and provided together with the encoded video signal. This is for example information about the spatial and/or temporal prediction, amount of quantization, etc.

SUMMARY

However, there is the problem that the deblocking filtering method used in conventional image coding methods and image decoding methods is ineffective.

In one general aspect, the techniques disclosed here feature a filtering method for applying a deblocking filter to a current block of an image, the filtering method including: judging whether a strong filter or a weak filter is to be applied to a boundary between the current block and a neighboring block adjacent to the current block; calculating a linear combination of current samples in the current block and adjacent samples in the neighboring block, the current samples and the adjacent samples forming a line of samples; shifting the linear combination right by a predetermined number of bits; and clipping the shifted linear combination to generate a filtered sample of the filtered current block, wherein the clipping for the strong filter is controlled by a first clipping parameter and the clipping for the weak filter is controlled by a second clipping parameter, the first clipping parameter and the second clipping parameter depending on a strength of the boundary but having a different value with each other.

General and specific aspect(s) disclosed above may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Given these problems with the existing technology, it would be advantageous to provide an efficient deblocking filtering approach.

BRIEF DESCRIPTION OF DRAWINGS

These and other advantages and features will become apparent from the following description thereof taken in conjunction with the accompanying Drawings by way of non-limiting examples of embodiments disclosed herein.

FIG. 6A is a schematic drawing illustrating an example of pixels close to a common boundary of two blocks involved in strong and weak deblocking filtering.

FIG. 6B is a schematic drawing illustrating an example of pixels close to a common boundary of two blocks involved in strong and weak deblocking filtering.

FIG. 7 is a table illustrating the results of the rounding operation.

FIG. 16 illustrates an example of a configuration of a recording medium that is an optical disk.

FIG. 17A illustrates an example of a cellular phone.

FIG. 18 illustrates a structure of multiplexed data.

FIG. 29 illustrates an example of a look-up table in which video data standards are associated with driving frequencies.

FIG. 30A is a diagram showing an example of a configuration for sharing a module of a signal processing unit.

FIG. 30B is a diagram showing another example of a configuration for sharing a module of the signal processing unit.

DETAILED DESCRIPTION (Underlying Knowledge Forming Basis of the Present Disclosure)

Figure 1:
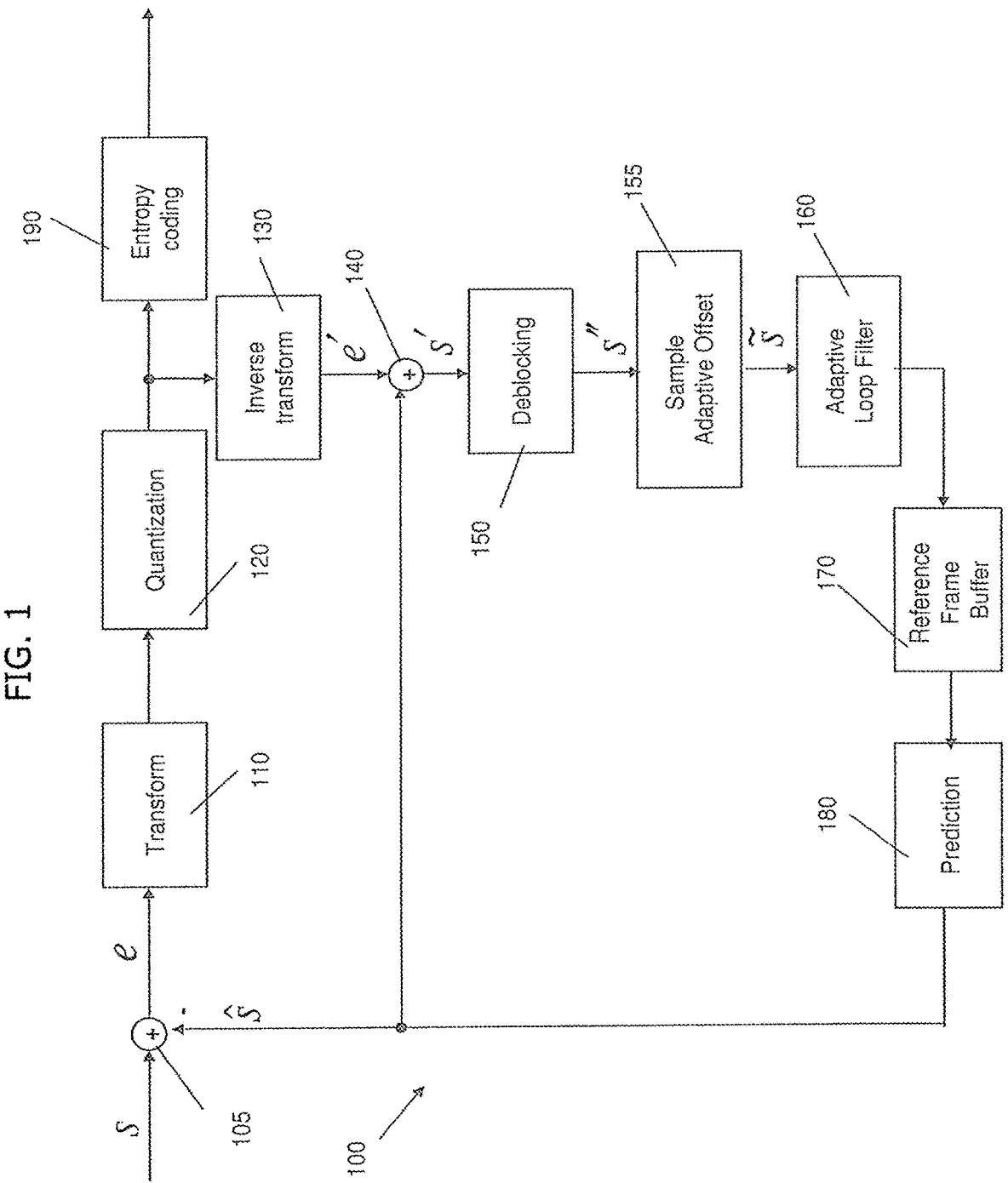
FIG. 1 is a block diagram illustrating an example of a video encoder.

FIG. 1 is an example of a typical H.264/MPEG-4 AVC and/or HEVC video encoder 100. A subtractor 105 first determines differences e between a current block to be encoded of an input video image (Input signal s) and a corresponding prediction block ŝ, which is used as a prediction of the current block to be encoded. The prediction signal may be obtained by a temporal or by a spatial prediction 180. The type of prediction can be varied on a per frame basis or on a per block basis. Blocks and/or frames predicted using temporal prediction are called "inter"-encoded and blocks and/or frames predicted using spatial prediction are called "intra"-encoded. Prediction signal using temporal prediction is derived from the previously encoded images, which are stored in a memory. The prediction signal using spatial prediction is derived from the values of boundary pixels in the neighboring blocks, which have been previously encoded, decoded, and stored in the memory. The difference e between the input signal and the prediction signal, denoted prediction error or residual, is transformed 110 resulting in coefficients, which are quantized 120. Entropy encoder 190 is then applied to the quantized coefficients in order to further reduce the amount of data to be stored and/or transmitted in a lossless way. This is mainly achieved by applying a code with code words of variable length wherein the length of a code word is chosen based on the probability of its occurrence.

Within the video encoder 100, a decoding unit is incorporated for obtaining a decoded (reconstructed) video signal s'. In compliance with the encoding steps, the decoding steps include dequantization and inverse transformation 130. The so obtained prediction error signal e' differs from the original prediction error signal due to the quantization error, called also quantization noise. A reconstructed image signal s' is then obtained by adding 140 the decoded prediction error signal e' to the prediction signal ŝ. In order to maintain the compatibility between the encoder side and the decoder side, the prediction signal ŝ is obtained based on the encoded and subsequently decoded video signal which is known at both sides the encoder and the decoder.

Due to the quantization, quantization noise is superposed to the reconstructed video signal. Due to the block-wise coding, the superposed noise often has blocking characteristics, which result, in particular for strong quantization, in visible block boundaries in the decoded image. Such blocking artifacts have a negative effect upon human visual perception. In order to reduce these artifacts, a deblocking filter 150 is applied to every reconstructed image block. The deblocking filter is applied to the reconstructed signal s'. For instance, the deblocking filter of H.264/MPEG-4 AVC has the capability of local adaptation. In the case of a high degree of blocking noise, a strong (narrow-band) low pass filter is applied, whereas for a low degree of blocking noise, a weaker (broad-band) low pass filter is applied. The strength of the low pass filter is determined by the prediction signal ŝ and by the quantized prediction error signal e'. Deblocking filter generally smoothes the block edges leading to an improved subjective quality of the decoded images. Moreover, since the filtered part of an image is used for the motion compensated prediction of further images, the filtering also reduces the prediction errors, and thus enables improvement of coding efficiency.

After a deblocking filter, a sample adaptive offset 155 and/or adaptive loop filter 160 may be applied to the image including the already deblocked signal s". Whereas the deblocking filter improves the subjective quality, sample adaptive offset (SAO) and ALF aim at improving the pixel-wise fidelity ("objective" quality). In particular, SAO adds an offset in accordance with the immediate neighborhood of a pixel. The adaptive loop filter (ALF) is used to compensate image distortion caused by the compression. Typically, the adaptive loop filter is a Wiener filter with filter coefficients determined such that the mean square error (MSE) between the reconstructed s' and source images s is minimized. The coefficients of ALF may be calculated and transmitted on a frame basis. ALF can be applied to the entire frame (image of the video sequence) or to local areas (blocks). Additional side information indicating which areas are to be filtered may be transmitted (block-based, frame-based or quadtree-based).

In order to be decoded, inter-encoded blocks require also storing the previously encoded and subsequently decoded portions of image(s) in the reference frame buffer 170. An inter-encoded block is predicted 180 by employing motion compensated prediction. First, a best-matching block is found for the current block within the previously encoded and decoded video frames by a motion estimator. The best-matching block then becomes a prediction signal and the relative displacement (motion) between the current block and its best match is then signalized as motion data in the form of three-dimensional motion vectors within the side information provided together with the encoded video data. The three dimensions consist of two spatial dimensions and one temporal dimension. In order to optimize the prediction accuracy, motion vectors may be determined with a spatial sub-pixel resolution e.g. half pixel or quarter pixel resolution. A motion vector with spatial sub-pixel resolution may point to a spatial position within an already decoded frame where no real pixel value is available, i.e. a sub-pixel position. Hence, spatial interpolation of such pixel values is needed in order to perform motion compensated prediction. This may be achieved by an interpolation filter (In FIG. 1 integrated within Prediction block 180).

For both, the intra- and the inter-encoding modes, the differences e between the current input signal and the prediction signal are transformed 110 and quantized 120, resulting in the quantized coefficients. Generally, an orthogonal transformation such as a two-dimensional discrete cosine transformation (DCT) or an integer version thereof is employed since it reduces the correlation of the natural video images efficiently. After the transformation, lower frequency components are usually more important for image quality then high frequency components so that more bits can be spent for coding the low frequency components than the high frequency components. In the entropy coder, the two-dimensional matrix of quantized coefficients is converted into a one-dimensional array. Typically, this conversion is performed by a so-called zig-zag scanning, which starts with the DC-coefficient in the upper left corner of the two-dimensional array and scans the two-dimensional array in a predetermined sequence ending with an AC coefficient in the lower right corner. As the energy is typically concentrated in the left upper part of the two-dimensional matrix of coefficients, corresponding to the lower frequencies, the zig-zag scanning results in an array where usually the last values are zero. This allows for efficient encoding using run-length codes as a part of/before the actual entropy coding.

The H.264/MPEG-4 H.264/MPEG-4 AVC as well as HEVC includes two functional layers, a Video Coding Layer (VCL) and a Network Abstraction Layer (NAL). The VCL provides the encoding functionality as briefly described above. The NAL encapsulates information elements into standardized units called NAL units according to their further application such as transmission over a channel or storing in storage. The information elements are, for instance, the encoded prediction error signal or other information necessary for the decoding of the video signal such as type of prediction, quantization parameter, motion vectors, etc. There are VCL NAL units containing the compressed video data and the related information, as well as non-VCL units encapsulating additional data such as parameter set relating to an entire video sequence, or a Supplemental Enhancement Information (SEI) providing additional information that can be used to improve the decoding performance.

Figure 2:
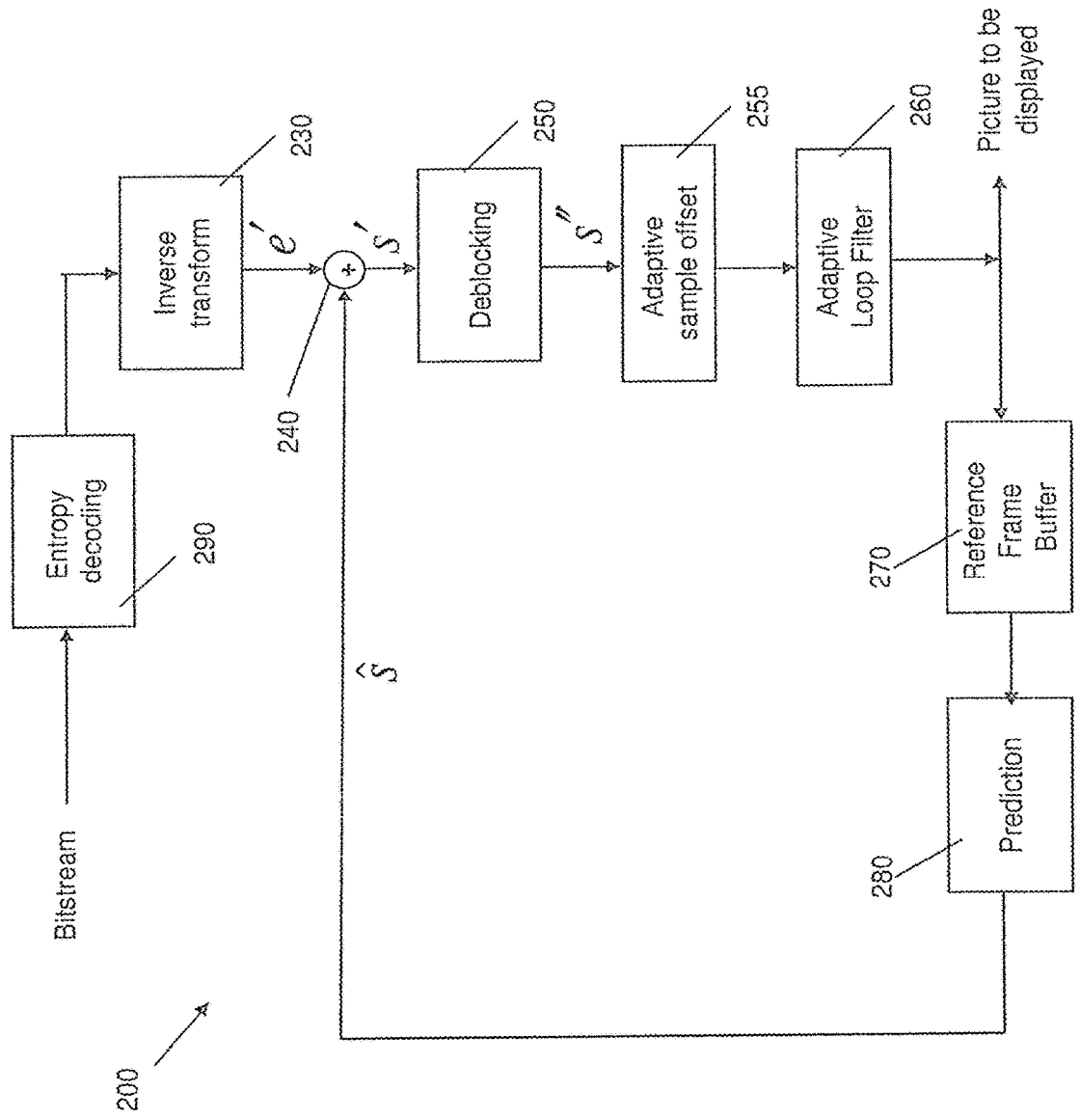
FIG. 2 is a block diagram illustrating an example of a video decoder.
Figure 3:
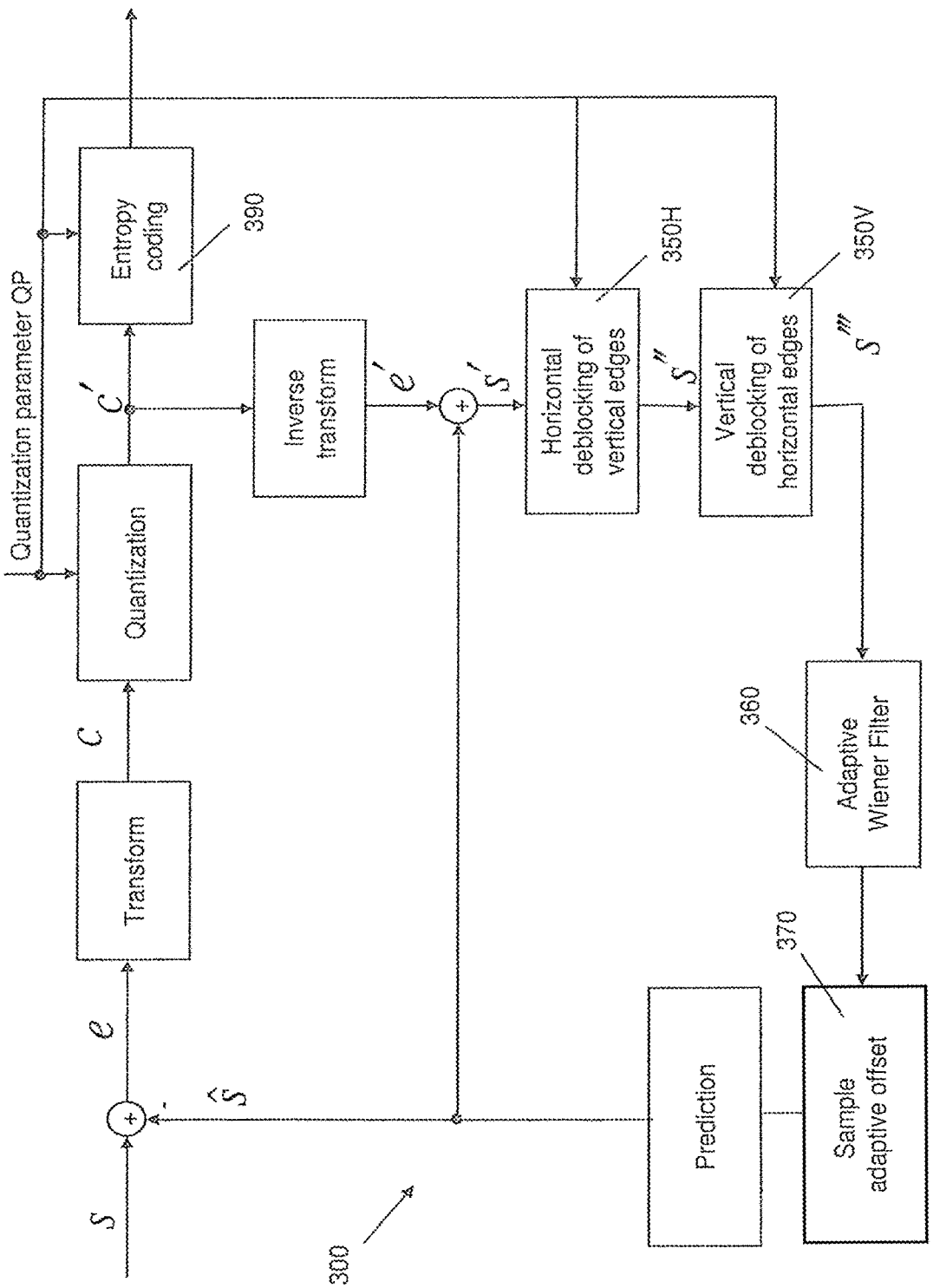
FIG. 3 is a block diagram illustrating an example of a video encoder with separated vertical and horizontal filtering.

FIG. 2 illustrates an example decoder 200 according to the H.264/MPEG-4 AVC or HEVC video coding standard. The encoded video signal (input signal to the decoder) first passes to entropy decoder 290, which decodes the quantized coefficients, the information elements necessary for decoding such as motion data, mode of prediction etc. The quantized coefficients are inversely scanned in order to obtain a two-dimensional matrix, which is then fed to inverse quantization and inverse transformation 230. After inverse quantization and inverse transformation 230, a decoded (quantized) prediction error signal e' is obtained, which corresponds to the differences obtained by subtracting the prediction signal from the signal input to the encoder in the case no quantization noise is introduced and no error occurred.

The prediction signal is obtained from either a temporal or a spatial prediction 280. The decoded information elements usually further include the information necessary for the prediction such as prediction type in the case of intra-prediction and motion data in the case of motion compensated prediction. The quantized prediction error signal in the spatial domain is then added with an adder 240 to the prediction signal obtained either from the motion compensated prediction or intra-frame prediction 280. The reconstructed image s' may be passed through a deblocking filter 250, sample adaptive offset processing 255, and an adaptive loop filter 260 and the resulting decoded signal is stored in the memory 270 to be applied for temporal or spatial prediction of the following blocks/images.

When compressing and decompressing an image, the blocking artifacts are typically the most annoying artifacts for the user. The deblocking filtering helps to improve the perceptual experience of the user by smoothing the edges between the blocks in the reconstructed image. One of the difficulties in deblocking filtering is to correctly decide between an edge caused by blocking due to the application of a quantizer and between edges which are part of the coded signal. Application of the deblocking filter is only desirable if the edge on the block boundary is due to compression artifacts. In other cases, by applying the deblocking filter, the reconstructed signal may be despaired, distorted. Another difficulty is the selection of an appropriate filter for deblocking filtering. Typically, the decision is made between several low pass filters with different frequency responses resulting in strong or weak low pass filtering. In order to decide whether deblocking filtering is to be applied and to select an appropriate filter, image data in the proximity of the boundary of two blocks are considered.

For instance, H.264/MPEG-4 AVC evaluates the absolute values of the first derivation (derivative) in each of the two neighboring blocks, the boundary of which is to be deblocked. In addition, absolute values of the first derivative across the edge between the two blocks are evaluated, as described, for instance in H.264/MPEG-4 AVC standard, Section 8.7.2.2. HEVC employs a similar mechanism, however, uses also a second derivative.

A deblocking filter may decide for each sample at a block boundary whether it is to be filtered or not and with which filter or filter type. When it is decided that a filter is to be applied, then a low pass filter is applied to smooth across the block boundary. The aim of the decision whether to filter or not is to filter only those samples, for which the large signal change at the block boundary results from the quantization applied in the block-wise processing as described in the background art section above. The result of the deblocking filtering is a smoothed signal at the block boundary. The smoothed signal is less annoying to the viewer than a blocking artifact. Those samples, for which the large signal change at the block boundary belongs to the original signal to be coded, should not be filtered in order to keep high frequencies and thus the visual sharpness. In the case of wrong decisions, the image is either unnecessarily smoothened or remains blocky. The deblocking filtering is performed across the vertical edges of the block (horizontal filtering) and across the horizontal edges of a block (vertical filtering).

Figures 4A, 4B:
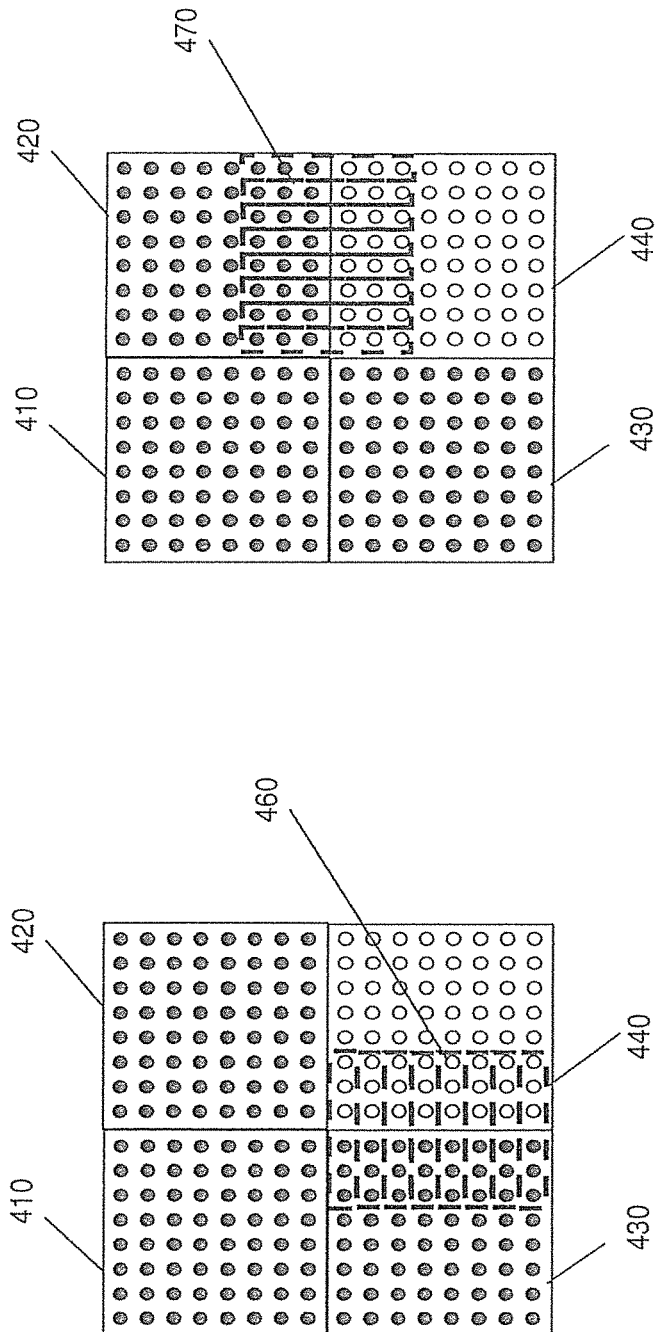
FIG. 4A is a schematic drawing illustrating application of horizontal deblocking filtering.
FIG. 4B is a schematic drawing illustrating application of vertical deblocking filtering.

FIG. 4A illustrates decision on a vertical boundary (to filter or not to filter with a horizontal deblocking filter) and FIG. 4B illustrates decision on a horizontal boundary (to filter or not with a vertical deblocking filter). In particular, FIG. 4A shows a current block 440 to be decoded and its already decoded neighboring blocks 410, 420, and 430. For the pixels 460 in a line, the decision is performed. Similarly, FIG. 4B shows the same current block 440 and decision performed for the pixels 470 in a column.

The judgment on whether to apply the deblocking filter may be performed as follows, similarly to H.264/MPEG-4 AVC. Let us take a line of six pixels 460, the first three pixels p2, p1, p0 of which belong to a left neighboring block A 430 and the following three pixels q0, q1, and q2 of which belong to the current block B 440 as also illustrated in FIG. 4A. Line 510 illustrates a boundary between the blocks A and B. Pixels p0 and q0 are the pixels of the left neighbor A and of the current block B, respectively, located directly adjacent to each other. Pixels p0 and q0 are filtered by the deblocking filtered for instance, when the following conditions are fulfilled:

$$|p_0 - q_0| < \alpha_{H264}(QP_{New}),$$

$$|p_1 - p_0| < \beta_{H264}(QP_{New}), \text{ and}$$

$$|q_1 - q_0| < \beta_{H264}(QP_{New}),$$

wherein, in general, $\beta_{H264}(QP_{New}) < \alpha_{H264}(QP_{New})$. These conditions aim at detecting whether the difference between p0 and q0 stems from blocking artifacts. They correspond to evaluation of the first derivation within each of the blocks A and B and between them.

Pixel p1 is filtered if, in addition to the above three conditions, also the following condition is fulfilled:

$$|p_2 - p_0| < \beta_{H264}(QP_{New}).$$

Pixel q1 is filtered, for instance, if in addition to the above first three conditions also the following condition is fulfilled:

$$|q_2 - q_0| < \beta_{H264}(QP_{New}).$$

These conditions correspond to a first derivation within the first block and a first derivation within the second block, respectively. In the above conditions, QP denotes quantization parameter indicating the amount of quantization applied, and $\beta, \alpha$ are scalar constants. In particular, $QP_{new}$ is quantization parameter derived based on quantization parameters $QP_A$ and $QP_B$ applied to the respective first and second block A and B as follows:

$$QP_{New} = (QP_A + QP_B + 1) >> 1,$$

wherein ">>1" denoted right shift by one bit.

Figure 5:
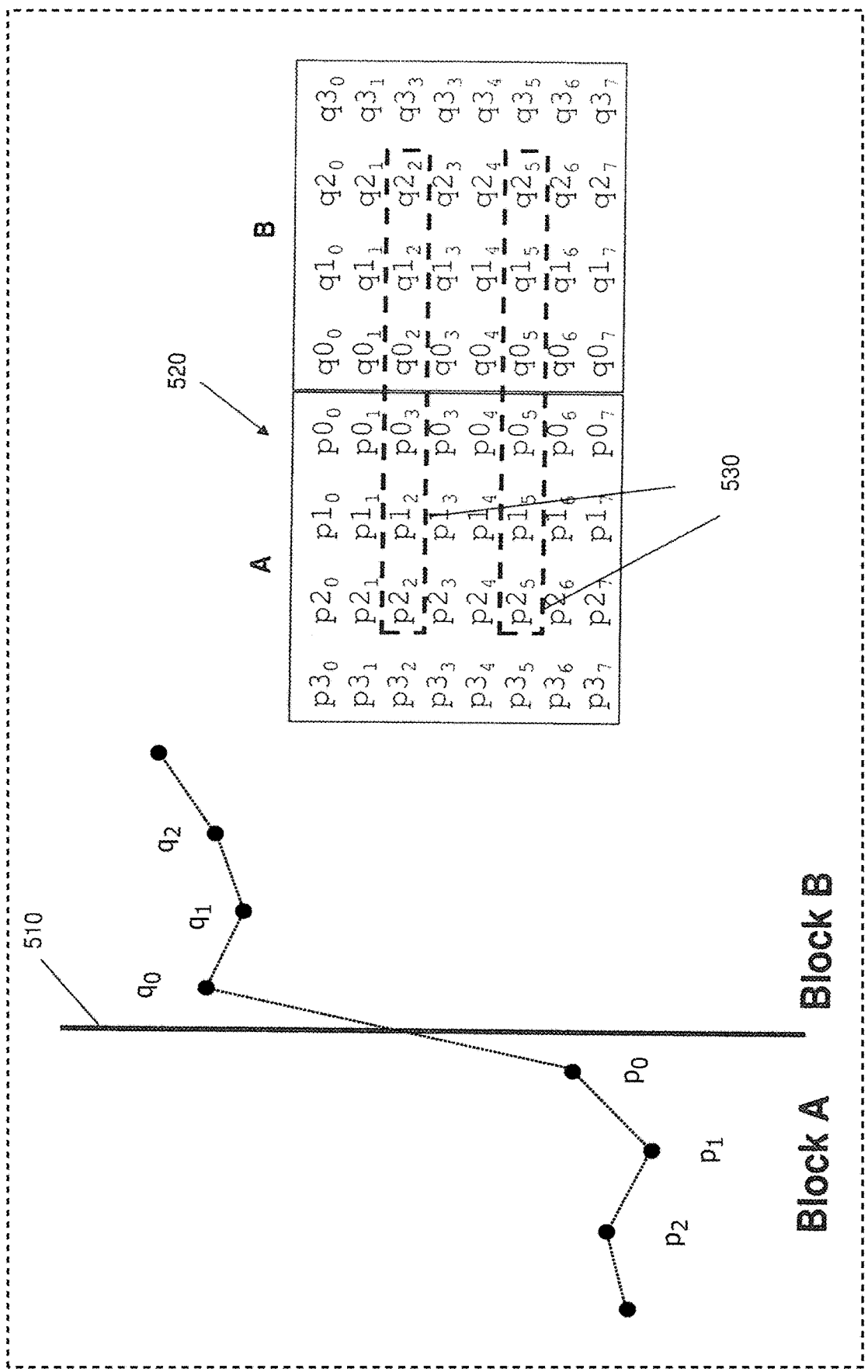
FIG. 5 is a schematic drawing illustrating a decision to apply or not to apply deblocking filter and a selection of a deblocking filter.

The decision may be performed only for selected line or lines of a block, while the filtering of pixels accordingly is then performed for all lines 460. An example 520 of lines 530 involved in decision in compliance with HEVC is illustrated in FIG. 5. Based on lines 530, the decision whether to filter entire block is carried out.

Another example of deblocking filtering in HEVC can be found in JCTVC-E603 document, Section 8.6.1, of JTC-VC, of ITU-T SG16 WP3 and ISO/IEC JTC1/SC29/WG11, freely available under http://phenix.int-evry.fr/jct/index.php/.

The two lines 530 are used to decide whether and how the deblocking filtering is to be applied. The example 520 assumes the evaluating of the third (with index 2) and the sixth (with index 5) line for the purpose of horizontally blocking filtering. In particular, the second derivative within each of the blocks is evaluated resulting in the obtaining of measures $d_2$ and $d_5$ as follows:

$$d_2 = |p2_2 - 2 \cdot p1_2 + p0_2| + |q2_2 - 2 \cdot q1_2 + q0_2|,$$

$$d_5 = |p2_5 - 2 \cdot p1_5 + p0_5| + |q2_5 - 2 \cdot q1_5 + q0_5|,$$

The pixels p belong to block A and pixels q belong to block B. The first number after p or q denotes column index and the following number in subscript denotes row number within the block. The deblocking for all eight lines illustrated in the example 520 is enabled when the following condition is fulfilled:

$$d = d_2 + d_5 < \beta(QP_{Frame}).$$

If the above condition is not fulfilled, no deblocking is applied. In the case that deblocking is enabled, the filter to be used for deblocking is determined. This determination is based on the evaluation of the first derivative between the blocks A and B. In particular, for each line i, wherein i is an integer between 0 and 7, it is decided whether a strong or a weak low pass filter is to be applied. A strong filter is elected if the following condition is fulfilled.

$$|(p3_i - p0_i| + |q3_i - q0_i| < (\beta(QP_{Frame}) >> 3) \wedge$$

$$d < (\beta(QP_{Frame}) >> 2) \wedge$$

$$|p0_i - q0_i| < ((t_c(QP_{Frame}) \cdot 5 + 1) >> 1).$$

In compliance with the HEVC model "the strong filter" filters samples $p2_i, p1_i, p0_i, q0_i, q1_i, q2_i$ using $p3_i, p2_i, p1_i, p0_i, q0_i, q1_i, q2_i, q3_i$, whereas a "weak filter" filters samples $p1_i, p0_i, q0_i, q1_i$ using $p2_i, p1_i, p0_i, q0_i, q1_i, q2_i$. In the above conditions, parameters $\beta$ and $t_c$ are both functions of the quantization parameter $QP_{Frame}$ which may be set for a slice of the image or the like. The values of $\beta$ and $t_c$ are typically derived based on $QP_{Frame}$ using lookup tables.

It is noted that strong filtering is only beneficial for very flat signals. Otherwise, a rather week low pass filtering is of advantage.

Figures 6A, 6B:
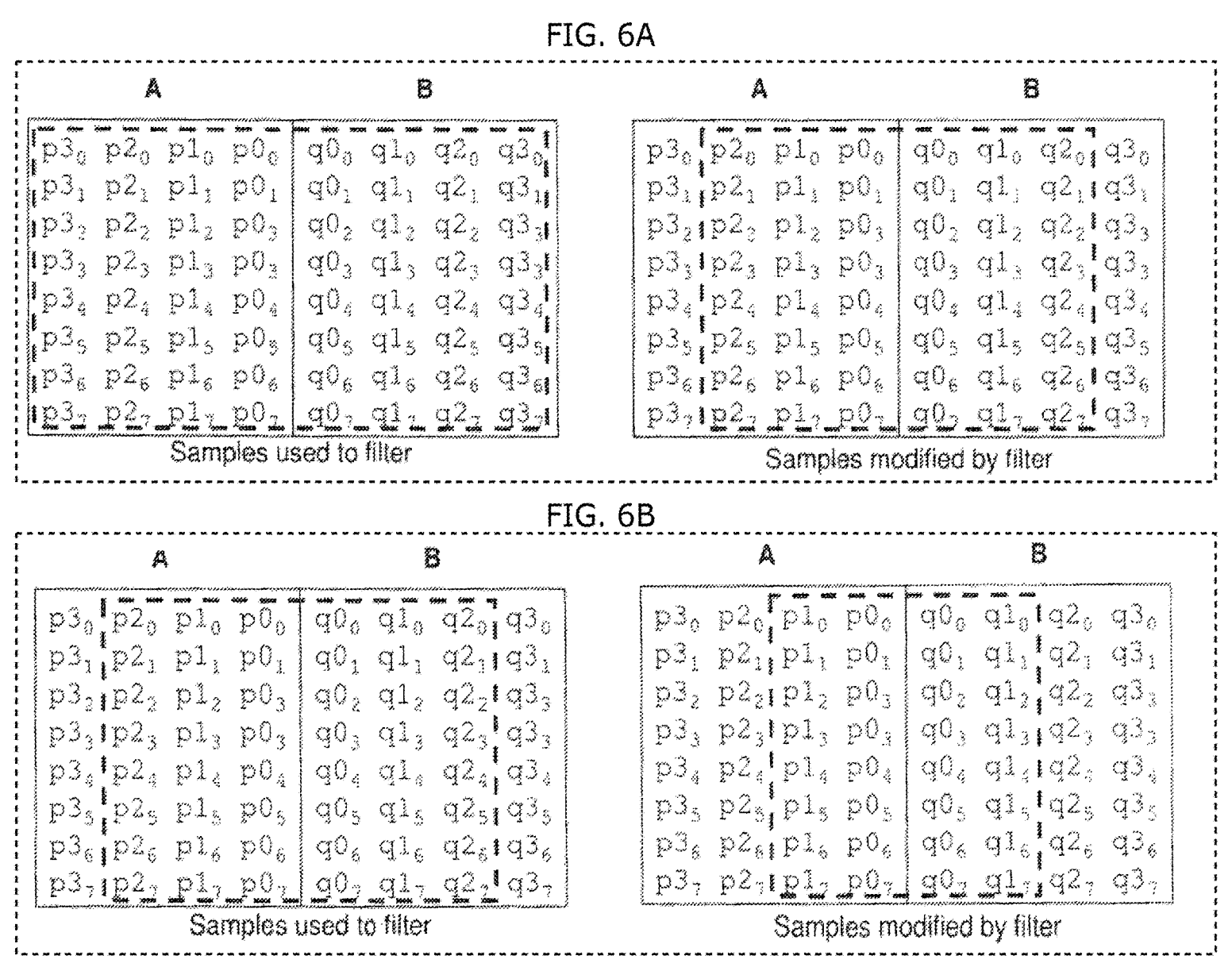

The pixels involved in the strong low pass filtering according to conventional hybrid coding are illustrated in FIG. 6A. In particular, FIG. 6A shows samples which are used for filtering. These samples correspond to respective four adjacent pixels left and right to the border between block A and B. These samples are used for filtering which means that their values are input to the filtering processing. FIG. 6A further shows samples which are modified by the filter. These are the three adjacent respective pixel values closest to the border between the block A and B to its right and to its left. These values are modified by the filter, i.e. they are smoothed. In particular, in the following, the values of the modified samples $p0'_i, p1'_i, p2'_i, q0'_i, q1'_i,$ and $q2'_i$ of line with index i are listed.

$$p0'_i = \text{Clip}((p2_i + 2 \cdot p1_i + 2 \cdot p0_i + 2 \cdot q0_i + q2_i + 4) >> 3)$$

$$p1'_i = \text{Clip}((p2_i + p1_i + p0_i + q0_i + 2) >> 2)$$

$p2'_i = \text{Clip}((2 \cdot p3_i + 3 \cdot p2_i + p1_i + p0_i + q0_i + 4) >> 3)$ $q0'_i = \text{Clip}((q2_i + 2 \cdot q1_i + 2 \cdot q0_i + 2 \cdot p0_i + p2 \cdot + 4) >> 3)$ $q1'_i = \text{Clip}((q2_i + q1_i + q0_i + p0_i + 2) >> 2)$ $q2'_i = \text{Clip}((2 \cdot q3_i + 3 \cdot q2_i + q1_i + q0_i + p0_i + 4) >> 3)$ The function Clip(x) is defined as follows:

$$\text{Clip}(x) = \begin{cases} 0; & x < 0 \\ \text{max\_allowed\_value}; & x > \text{max\_allowed\_value} \\ x; & \text{else} \end{cases}$$

Hereby, max_allowed_value is a maximum value, which x can have. In the case of PCM coding with k bit samples, the maximum value would be max_allowed_value=$2^k-1$. For instance, in the case of PCM coding with 8 bit samples, the maximum value would be max_allowed_value=255. In the case of PCM coding with 10 bit samples, the maximum value would be max_allowed_value=1023.

The above equations thus describe the process of strong filtering to be applied. As can be seen from the above equations, pixels $p3_i$ and $q3_i$ of the row i are used in the equations, i.e. in the filtering, but they are not modified, i.e. filtered.

FIG. 6B illustrates application of a weak deblocking filter. In particular, samples used for filtering are shown on the left side and samples modified by filtering are shown on the right side. For the weak filter operations only the respective two adjacent pixels on the border between blocks A and B are filtered while respective three adjacent pixels in each of blocks A and B on their border are used. Two decisions are made for the purpose of the weak filtering. The first decision relates to whether a weak filter is to be applied at all or not for a particular line. This decision is based on value Δ which is calculated as follows $\Delta = (9 \cdot (q0_i - p0_i) - 3 \cdot (q1_i - p1_i) + 8) >> 4$ Based on the calculated Δ the filtering is only applied if $|\Delta| < 10 \cdot t_c$. Otherwise the filtering is not applied to the two pixels $p0'_i$ and $q0'_i$ lying on the boundary of the respective blocks A and B.

If the filtering is to be applied, it is performed as follows:

$p0'_i = \text{Clip}(p0_i + \Delta_1)$ $q0'_i = \text{Clip}(q0_i - \Delta_1)$ wherein $\Delta_1 = \text{Clip3}(-t_c, t_c, \Delta)$.

The function Clip(x) is defined as above. The function Clip3(x) is defined as follows:

$$\text{Clip3}(x, a, b) = \begin{cases} a; & x < a \\ b; & x > b \\ x; & \text{else} \end{cases}$$

When it is decided that the filtering is going to be applied and pixels $p0'_i$ and $p0'_i$ had been filtered it is further decided whether pixels $p1'_i$ and $p1'_i$ are to be filtered.

Pixel $p1'_i$ is filtered only if $d_p < (\beta/6)$ and correspondingly pixel $q1'_i$ is filtered, only if $d_q < (\beta/6)$. The filtering of these pixels is performed as follows $p1'_i = \text{Clip}(p1_i + \Delta_{2p})$ $q1'_i = \text{Clip}(q1_i + \Delta_{2q})$ with $\Delta_{2p} = \text{Clip3}(-t_{c2}, t_{c2}, (((p2_i + p0_i + 1) >> 1) - p1_i + \Delta_1) >> 1)$, $\Delta_{2q} = \text{Clip3}(-t_{c2}, t_{c2}, (((q2_i + q0_i + 1) >> 1) - q1_i - \Delta_1) >> 1)$, and $t_{c2} = t_c >> 1$, The above description of the decision and selection of the deblocking filter is typically employed for the luminance samples.

For the deblocking filtering of the chrominance, the following approach is used. The Delta value is calculated as follows:

$\Delta = (((q0_i - p0_i) << 2) + p1_i - q1_i + 4) >> 3$.

Based on the Delta value, the Delta1 value is calculated and used directly for the deblocking filtering as follows:

$\Delta_1 = \text{Clip3}(-t_c, t_c, \Delta)$, and $p0'_i = \text{Clip}(p0_i + \Delta_1), q0'_i = \text{Clip}(q0_i - \Delta_1)$.

As can be seen from the above procedure of the weak filtering operation, value Δ may be involved in several decision and filtering steps.

In particular, the Δ is involved:
In the decision (luma) of whether a weak filter has to be applied or not for a particular line,
in the (weak) filtering of pixels $p0'_i$ and $q0'_i$, and
over involvement of value $\Delta_1$ also in the filtering of pixels $p1'_i$ and $q1'_i$.

It is thus advantageous to calculate the value of Δ as accurately as possible.

Given these problems with the existing technology, it would be advantageous to provide an efficient deblocking filtering approach to separately control the parameters for filtering.

The particular approach of the present disclosure is to control separately the strong and weak filtering.

This is achieved by the features of the independent claims. Advantageous embodiments are subject matter of the dependent claims.

Embodiment 1

As shown above, the Delta (Δ) value is implemented by a shift operation as:

$\Delta = (9 \cdot (q0_i - p0_i) - 3 \cdot (q1_i - p1_i) + 8) >> 4$.

The shift operation can be interpreted as a quantization of the Delta value (to achieve an integer division) and corresponds to the following unquantized Delta value:

$$\Delta_k = \frac{9 \cdot (q0_i - p0_i) - 3 \cdot (q1_i - p1_i)}{16}.$$

Accordingly, the division by 16 is implemented by right shift (">>") by four bits. The shift operation not only introduces inaccuracy by means of the quantization but also causes the resulting quantized Delta values to have an offset with respect to the zero mean.

FIG. 7 illustrates the partial results of the rounding operation using the shift by four bits. The first column of the table in FIG. 7 shows example values of a variable i ranging from −20 to +20. The second column lists the corresponding values i after the addition of offset value 8. Finally, the third column shows shift by four corresponding to integer division by 16 of the term i+8. As can be seen from the table, the distribution of the resulting values in the third column is asymmetric and has a non zero mean even when i had a zero-mean.

Figure 8:
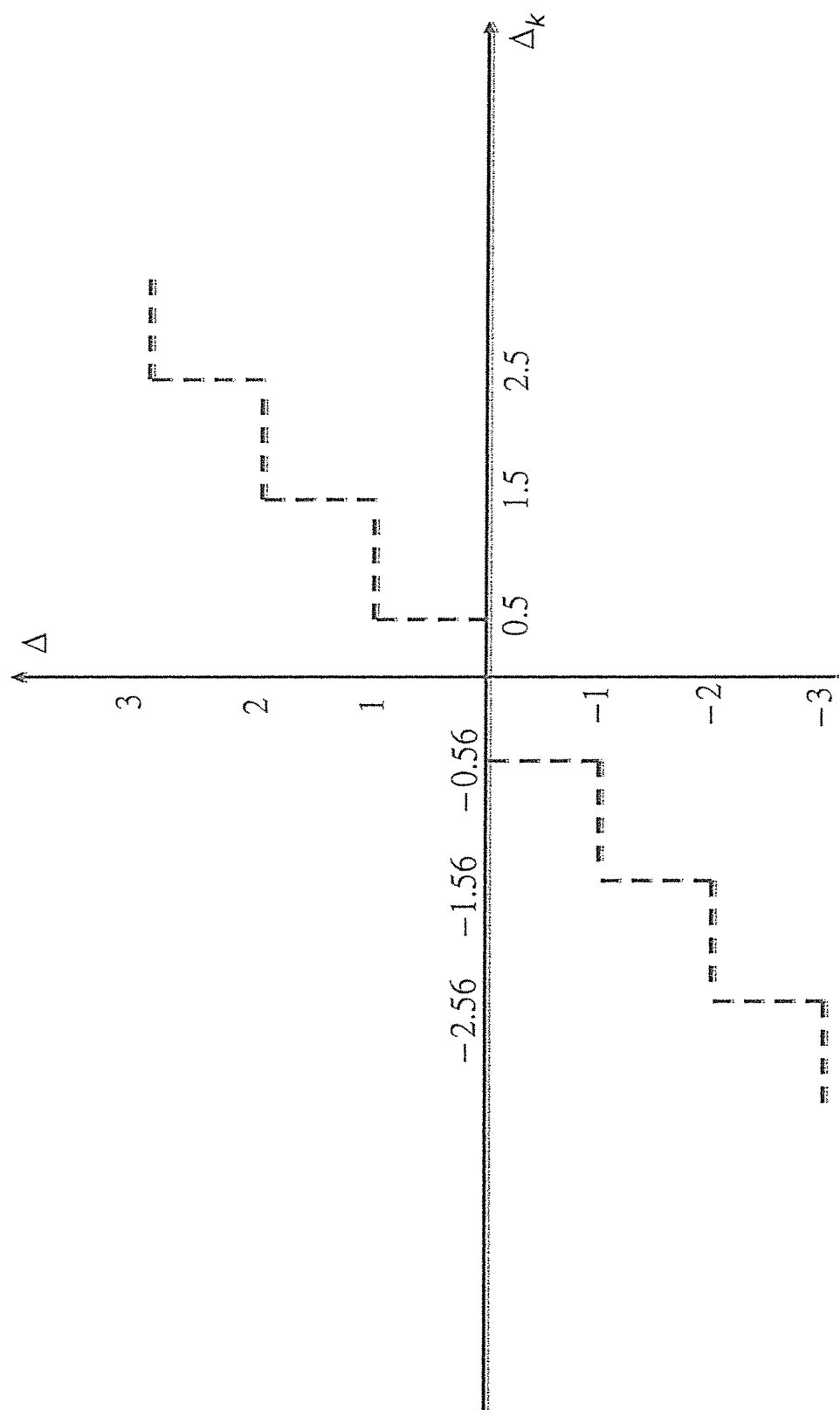
FIG. 8 is a schematic drawing illustrating asymmetry of a delta quantizer.

This results in an asymmetric quantizer characteristic as shown in FIG. 8. Even when the unquantized Delta values have a typical symmetric probability distribution, after the quantization as shown above an offset is generated and $E[\Delta]-E[\Delta_k] \neq 0$.

The Delta value is calculated in order to perform deblocking filtering process. This Delta value is generated as a weighted sum of sample values at the boundary between the two adjacent blocks to which a constant offset is added. The constant is equal to eight in this example. The so obtained result is subsequently shifted by one or more bits to the right in order to clip the result. For symmetrically distributed weighted sums of sample values, the resulting Delta has been introduced an offset, i.e. Its expected value is unequal to zero.

In order to overcome this problem, in accordance with the present disclosure different constants are added before the right shift of the weighted sum of sample values. The different constants are selected in such a way that the expected value of the Delta is zero. In particular, the quantization of the Delta value may be performed as:

$$\Delta = \begin{cases} (9 \cdot (q0_i - p0_i) - 3 \cdot (q1_i - p1_i) + a) \gg 4; \Delta_k \geq 0 \\ (9 \cdot (q0_i - p0_i) - 3 \cdot (q1_i - p1_i) + b) \gg 4; \Delta_k < 0 \end{cases}$$

Values a and b are then selected so as to result in a zero mean distribution of the Delta value.

Figure 9A:
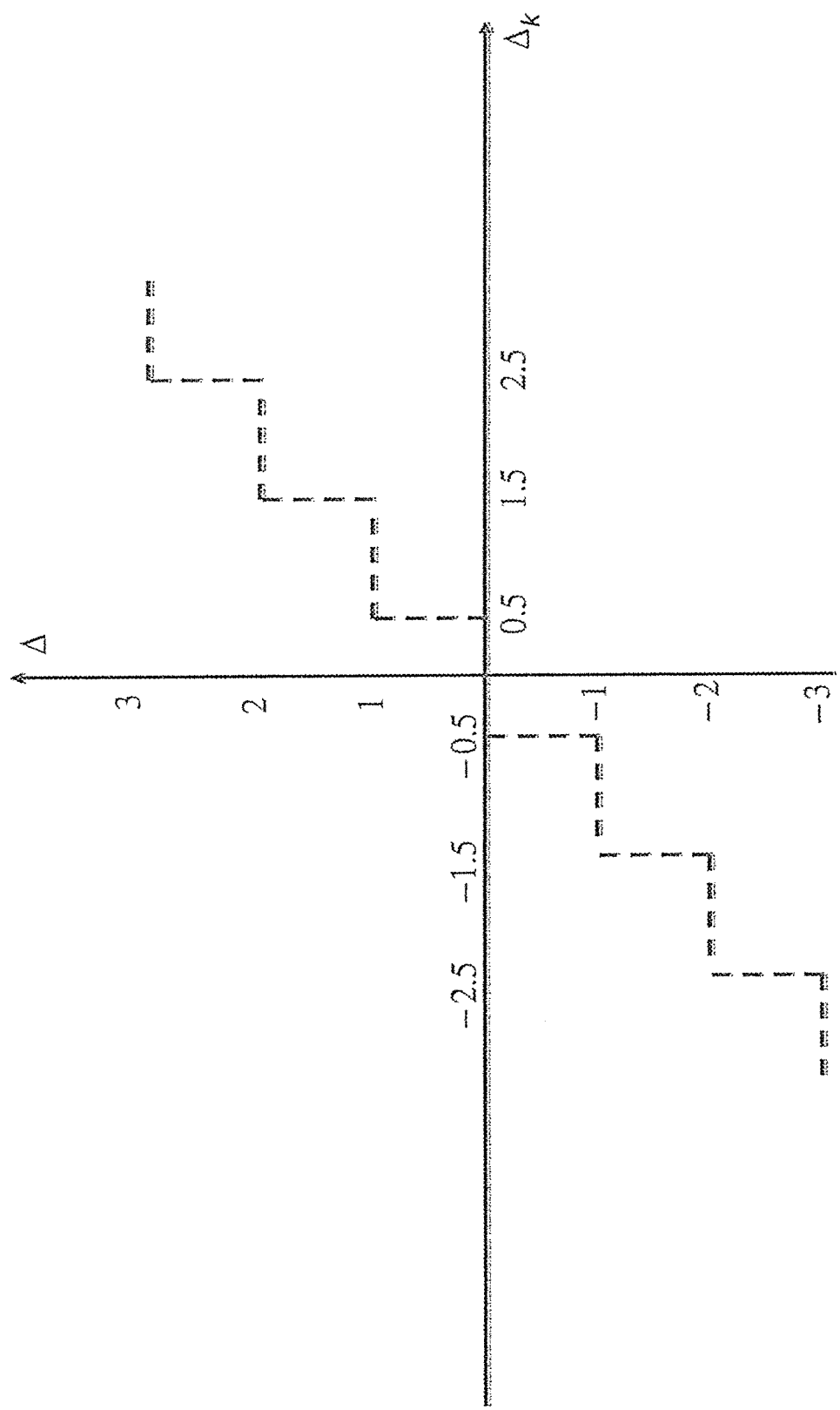
FIG. 9A is a schematic drawing illustrating quantization of delta in accordance with an example of the present disclosure.

For instance, according to a first example, a is equal to seven (a=7) and b is equal to eight (b=8). The resulting characteristic of the thus symmetric quantizer for a=7 and b=8 is shown in FIG. 9A. In the case that this probability distribution of the unquantized Delta is symmetric, the quantizer generates no additional offset and:

$E[\Delta]-E[\Delta_k]=0$.

Figure 9B:
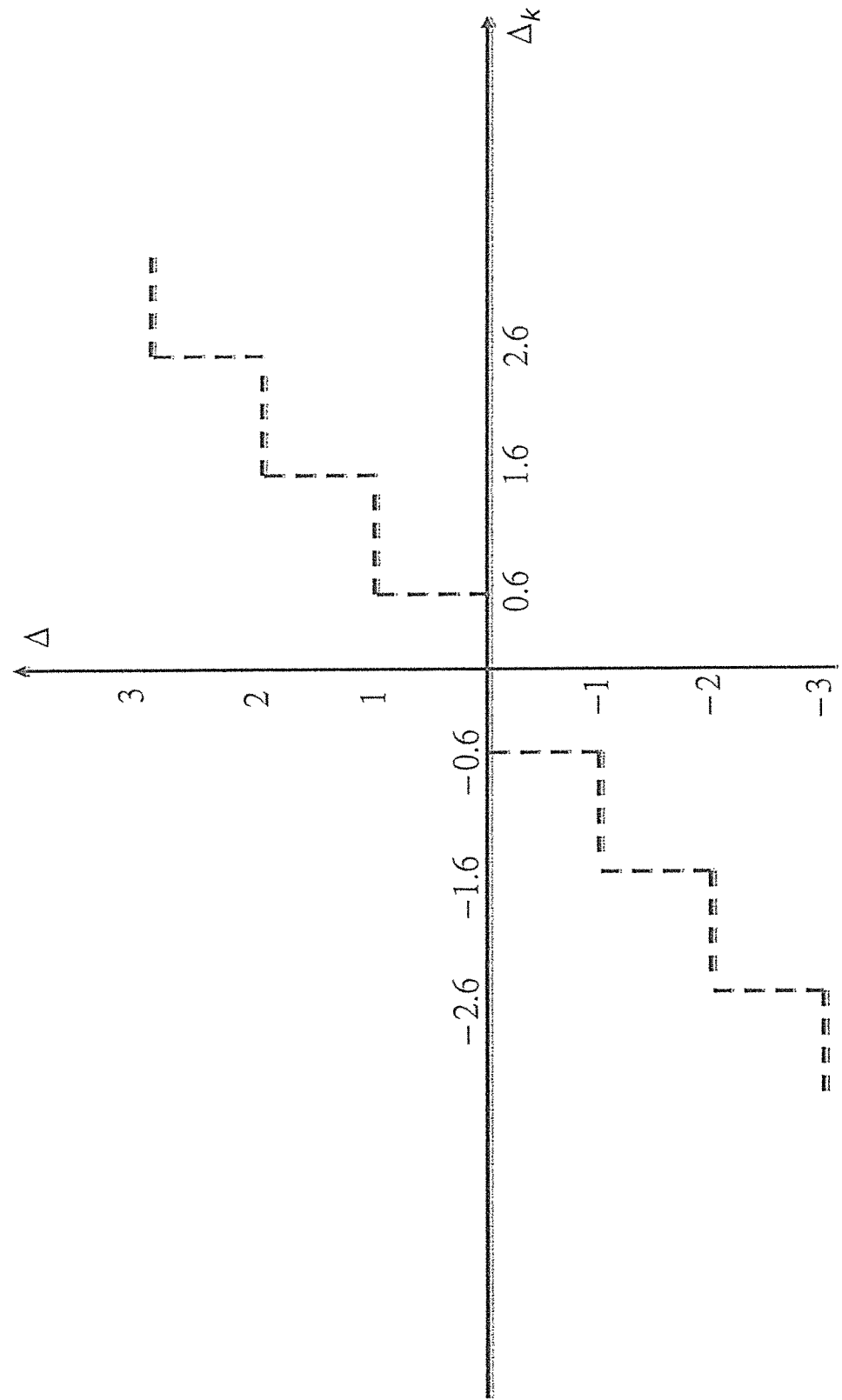
FIG. 9B is a schematic drawing illustrating quantization of delta in accordance with an example of the present disclosure.

However, the present disclosure is not limited by the particular values of parameters a and b. Constants a and b may be selected arbitrarily in such a way that the distribution of the quantized Delta is zero mean. For instance, in accordance with the second example, constant a is equal to six (a=6) and constant b is equal to nine (b=9). The corresponding quantizer is shown in FIG. 9B. Compared to the quantizer of FIG. 9A, this quantizer has a dead zone larger than the quantizer of FIG. 9A. Thus, by selecting parameters a and b, the dead zone of the quantizer may be controlled. Similarly to the example of FIG. 9A, the mean value of the quantized Delta has no offset with respect to the mean value of the Delta before quantization.

It is beneficial to select values a=6 and b=9 or a=7 and b=8, when shifting by four bits (">>4") is used, which is usually employed for luminance samples. On the other hand, when shifting by three bits (">>3") is employed, the values of a=2 and b=5 are advantageous. A shift of 3 bits right is typically employed for deblocking of chrominance samples. For shifting by a single bit (">>1"), values of a=0 and b=1 may advantageously be employed.

As can be seen from the above equation, for symmetric quantization of Delta values, one additional "if" operation is necessary to quantize the Delta values accordingly. Namely, it is to be distinguished between $\Delta_k$ smaller or greater than zero. This may increase the computational expenses. In order to efficiently implement the symmetric quantization of the Delta value as described above, this quantization may be combined with the subsequent clipping operation. In the following, a pseudo code for implementing Delta calculation and the subsequent comparison of the so calculated Delta with the threshold $t_c$ is exemplified.

```
delta1 = (9*(q0-p0) -3*(q1-p1)+8)>>4
if (delta1>tc)
{
  delta1=tc;
}
else if (delta1<-tc)
{
  delta1=-tc;
}
```

In this implementation, two comparisons with a non-zero value are performed. Both are to be executed at each run of the code. Alternatively, the following pseudo-code may implement the same functionality:

```
delta1 = (9*(q0-p0) -3*(q1-p1)+8)>>4
if (delta1>0)
{
  if (delta1>tc)
  {
    delta1=tc;
  }
}
else
{
  if (delta1<-tc)
  {
    delta1=-tc;
  }
}
```

In this case, one comparison with zero (sign comparison) is performed and then only one of the two comparisons with a non-zero number (since the two comparisons with non-zero number are now alternative).

In accordance with an embodiment of the present disclosure, the calculation of the Delta as well as the subsequent comparison with the threshold $t_c$ for implementing the clipping, may be realized as follows:

```
delta = 9*(q0-p0) -3*(q1-p1)
if (delta>0)
{
  delta1=(delta+a)>>4;
  if (delta1>tc)
  {
    delta1=tc;
  }
}
else
{
  delta1=(delta+b)>>4;
  if (delta1<-tc)
  {
    delta1=-tc;
  }
}
```

As can be seen from the above pseudo-code, no additional operation is necessary when compared to the above codes. Only a single comparison with zero is necessary and only a single one of the two comparisons with a non-zero value shall further be executed when run.

Figure 10:
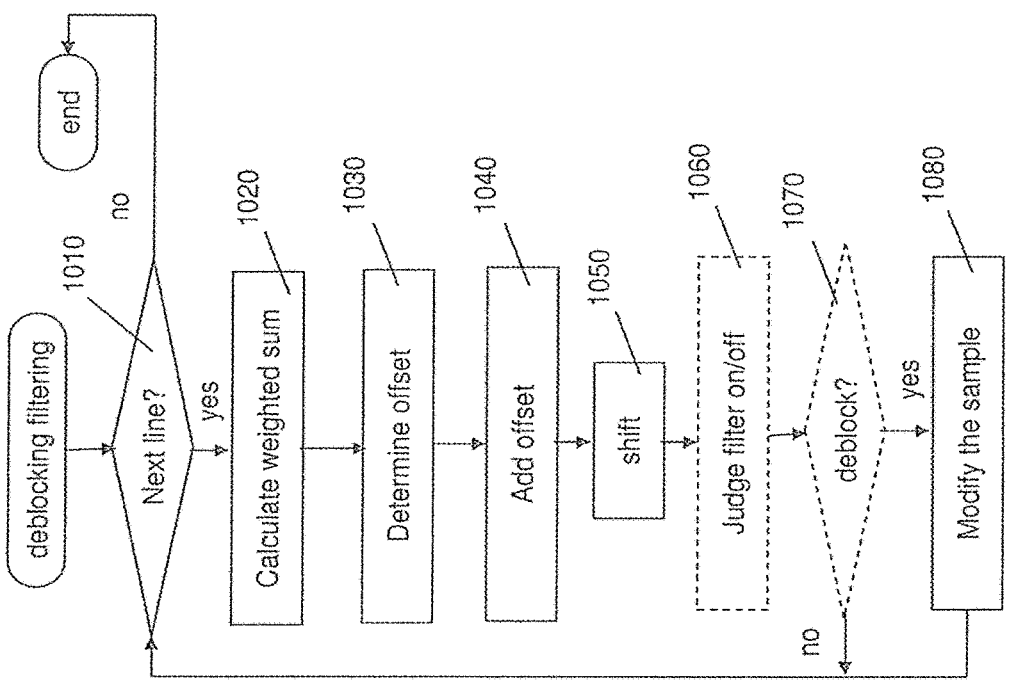
FIG. 10 is a flow diagram illustrating a method according to an embodiment of the present disclosure.

FIG. 10 illustrates a flow chart of a method according to an embodiment of the present disclosure. For each line of a block 1010 a decision parameter is calculated. This is performed by calculating 1020 a weighted sum of adjacent samples at the boundary between a current block and its neighboring block, wherein the samples form a line of samples. The line of samples may be a column or a row of the block. The samples are, for instance, as shown above pixels $p0_i$, $q0_i$, $p1_i$, and $q1_i$. In this case, the samples form a row of the block in order to deblock the vertical boundary. However, the present disclosure is equally applicable for deblocking filtering of horizontal boundaries, in which case the pixels to be filtered or used for filtering form a column. After calculating the weighted sum 1020, an offset is determined 1030. The value of the offset depends on the value of the weighted sum. The offset is added 1040 to the weighted sum. The so obtained offset weighted sum is then shifted 1050 to the right by a predetermined number of bits. This shifting implements an integer division. This may be performed differently for luminance and chrominance samples.

The decision parameter corresponds to the shifted and offset weighted sum. The decision parameter may further be used to judge 1060 whether a deblocking filter is to be applied to a sample of the current block at the boundary. If 1070 it is judged that deblocking filtering is to be applied ("yes" in step 1270), the line is deblocked 1280, i.e. the sample of the current block at the boundary (e.g. $p0'_i$) is filtered. Otherwise ("no" in step 1270), the deblocking filtering is not applied to this sample and/or the entire line. However, it is noted that the decision process is not necessarily to be performed. It may be advantageous to perform the decision process based on the decision parameter calculated only for the luminance samples. For the chrominance samples, the decision whether deblocking filter is to be applied or not may be skipped and it may be directly filtered. However, the present disclosure is also not limited to the above described different handlink of luminance and chrominance and, in general, the decision process does not need to be performed at all, rather a filter selection and/or filtering may be performed based on the decision parameter. Therefore, the decision parameter may also be called "sample modification parameter", since it may be used to modify (filter) the sample.

In accordance with an embodiment of the present disclosure, the offset takes a first value when the weighted sum is positive and takes a second value different from the first value when the weighted sum is negative. If the weighted sum has a value of 0, it may be further defined whether the first, the second or a first value is taken. The first and the second value are advantageously determined in such a way that the mean of the weighted sum is equal to the mean of the decision parameter. In this way, no shift in the mean value is artificially introduced by the operation of integer division implemented as right shift.

Advantageously, when the predetermined number of bits is 4, the first value is 6 and the second value is 9 or the first value is 7 and the second value is 8. Alternatively, when the predetermined number of bits is 3, the first value is 2 and the second value is 5. Still more alternatively, when the predetermined number is 1, the first value may be 0 and the second value may be 1. It is noted that the above values may be exchanged, i.e. the first value would be the second value and the second value would be the first value. The predetermined value (number of bits to be shifted) with size 4 is typically employed for deblocking filtering of the luminance samples. Also the shift value of 1 bit is typically employed for filtering the luminance. On the other hand, the predetermined value used for shifting by 3 bits is typically employed for filtering the chrominance part of the image.

In accordance with an advantageous embodiment of the present disclosure, the method further includes calculating a filtering parameter by clipping the absolute value of the decision parameter to a clipping value. The filtering parameter is used for filtering the sample at the boundary of the current block. In particular, the filtering is performed by adding the filtering parameter to the sample and the result may be clipped. In order to simplify the implementation and reduce the computational costs, the decision and the filtering parameters may be calculated by the following steps:

Firstly, the weighted sum of the pixel values in the line is calculated. When the weighted sum is greater than 0, the weighted sum is offset by the first value and shifted by the predetermined number of bits to obtain the decision parameter. When the decision parameter is larger than the clipping value, the filtering parameter is obtained by clipping the decision parameter to the clipping value, otherwise the filtering parameter is equal to the decision parameter.

When, on the other hand, the weighted sum, is not greater than 0, the weighted sum is offset by the second value and shifted by the predetermined number of bits to obtain the decision parameter. When the decision parameter is smaller than the negative clipping value, the filtering parameter is obtained by clipping the decision parameter to the negative clipping value, otherwise the filtering parameter is equal to the decision parameter. In the above, it is assumed that the clipping value is a positive integer.

As shown above, when performing the deblocking filtering, the efficiency loss and/or loss of quality may be caused by integer implementation and additional quantization errors may thus be introduced by the deblocking operations.

In accordance with another aspect of the present disclosure, in addition to adjusting the subjective quality by controlling the ratio between strong, weak or no filtering, maximum allowed modification by the deblocking filter is controlled. This enables adjustment of the objective quality by limiting the quantization errors introduced by the deblocking. Accordingly, the objective quality can be adjusted independently of the subjective quality, and thus in an optimal way. In particular, in HM4.0, the threshold value $t_c$ is determined as follows:

$$i_{tc} = \text{Clip3}(0, QP_{max}+4, QP+tc_{offset})$$

$$t_c = tc\text{table}[i_{tc}] \cdot \text{bitdepthscale}$$

wherein $$\text{Clip3}(x, a, b) = \begin{cases} a; & x < a \\ b; & x > b \\ x; & \text{else} \end{cases}$$

$$tc_{offset} = \begin{cases} 2; & BS > 0 \\ 0; & \text{else} \end{cases}$$

Parameter $QP_{max}$ Indicates the maximum possible QP value, which is typically 51, resulting in upper clipping threshold $QP_{max}+4$ of 55. The parameter "bitdepthscale" Is a scaling factor which depends on the bit depth of samples to be deblocked. For instance, the internal bit depth may be 10 while the input signal has a bit depth of 8. Parameter BS indicates "boundary strength" and its value typically differs for intra and inter prediction. For instance, for intra prediction it may take values 2 or 3 and for the inter prediction, it may be 0, 1, or 2.

The tctable is a field of possible values, for instance:

```
Const UChar tctable_8×8 [56] =
{
  0, 0, 0, 0, 0, 0, 0, 0, 0, 0, 0, 0, 0, 0, 0, 0, 0, 1, 1, 1, 1, 1,
  1, 1, 1, 2, 2, 2, 2, 3, 3, 3, 3, 4, 4, 4, 5, 5, 6, 6, 7, 8, 9, 9, 10,
  10, 11, 11, 12, 12, 13, 13, 14, 14
};
```

Similarly the threshold p is determined as follows:

$i_\beta = \text{Clip3}(0, QP_{max}, QP)$, $\beta = \text{betatable}[i_\beta] \cdot \text{bitdepthscale}$ with the "betatable" defined, for instance, as

```
Const UChar betatable_8×8 [52] =
{
  0, 0, 0, 0, 0, 0, 0, 0, 0, 0, 0, 0, 0, 0, 0, 0, 6, 7, 8, 9, 10, 11, 12,
  13, 14, 15, 16, 17, 18, 20, 22, 24, 26, 28, 30, 32, 34, 36, 38,
  40, 42, 44, 46, 48, 50, 52, 54, 56, 58, 60, 62, 64
};
```

The contribution JCTVC-F143, "CE12: Deblocking filter parameter adjustment in slice level" suggests determining the threshold value $t_c$ by using an additional offset coded within the slice header as follows:

$i_{tc} = \text{Clip3}(0, QP_{Max}+4, QP+tc_{offset}+tc_{offset,coded})$ $t_c = tc\text{table}[i_{tc}] \cdot \text{bitdepthscale}$ wherein tctable remains same as above.

Similarly, the contribution JCTVC-F143 suggests adding additional offset coded in the slice header to the calculation of the threshold value β as follows:

$i_\beta = \text{Clip3}(0, QP_{Max}, QP+\beta_{offset,coded})$ $\beta = \text{betatable}[i_\beta] \cdot \text{bitdepthscale}$ The additional offset according to JCTVC-F143 affects the enabling or disabling of deblocking for an entire block. In particular, the block is filtered only when:

$d = d_q + d_p < \beta$ as already described in the background section above. When the deblocking filtering is enabled, the parameter p is further used to adjust the ratio between strong and weak filtering. It is used to decide for each individual line or column whether a weak or a strong filter is to be applied and whether the second boundary-closest pixel (p1, q1) is to be deblocked or not. However, there is no effect on the strong filtering operation itself.

The threshold $t_c$ is used in the performing of the decision whether a weak filter is to be applied or not. Moreover, parameter $t_c$ is further used in the calculation of parameter Delta1 and in the actual filtering of samples p0′$_i$ and q0′$_i$, as shown above. The parameter $t_c$ further adjusts maximum modification by the deblocking filter (cf. clip3 values a, b in the filtering operations described in the background section).

In accordance with an embodiment of the present disclosure, the deblocking filtering is further finer controlled by the high-level parameters which may be transmitted at the picture, slice or sequence level. In particular, the deblocking filtering is controlled (as shown in the background section) by the parameter $t_c$ and by the parameter beta. These parameters are used to determine the strength of filtering and/or decide whether the filtering is to be applied. It has direct influence also to the clipping during the filter application. The decision whether weak/strong filtering is to be applied influences mostly the subjective image quality. In contrast, the influence on clipping operation regards mainly the objective quality. The present disclosure enables separate controlling the objective and subjective quality related stages of deblocking filtering separately.

Accordingly, the threshold $t_c$ differs for different stages of the deblocking decision and filtering operations by different offset which may be provided (embedded) in the slice header. In particular, a first threshold value $t_{c1}$ may be calculated as follows:

$i_{tc1} = \text{Clip3}(0, QP_{Max}+4, QP+tc_{offset}+tc_{offset,coded})$ $t_{c1} = tc\text{table}[i_{tc1}] \cdot \text{bitdepthscale}$ A second threshold $t_{c2}$ may be defined as:

$i_{tc2} = \text{Clip3}(0, QP_{Max}+4, QP+tc_{offset}+t_{offset2,coded})$ $t_{c2} = tc\text{table}[i_{tc2}] \cdot \text{bitdepthscale}$.

In other words, a first parameter tot is obtained based on the quantization parameter (QP) offset by a calculated offset ($tc_{offset}$) and by a first value signalled in the bitstream ($tc_{offset,\ coded}$). A second parameter $t_{c2}$ is obtained based on the quantization parameter offset (QP) by the calculated offset ($tc_{offset}$) and by a second value signalled in the bitstream ($tc_{offset2,\ coded}$).

The two different threshold values $t_{c1}$ and $t_{c2}$ are employed in the procedure of deblocking filter decisions and selection as follows. The decision on whether a deblocking filter is to be applied for the entire block of 8×8 pixels may be performed, as shown above for the state of the art. The decision on whether a strong or a weak deblocking filter is to be applied for a particular line or a column of pixels is performed based on the first threshold value $t_{c1}$. In particular, a strong filter is applied if $|p3_i - p0_i| + |q3_i - q0_i| < (\beta >> 3) \wedge$ $d < (\beta >> 2) \wedge$ $|p0_i - q0_i| < ((t_{c1} \cdot 5 + 1) >> 1)$ In all other cases, a weak deblocking filter is applied. Accordingly, the first parameter (threshold) $t_{c1}$ is used to control the subjective quality, namely, the (decision between) application of weak or strong filtering.

The value of Delta is calculated in a similar way, as shown in the background of the disclosure, namely as $\Delta = (9 \cdot (q0_i - p0_i) - 3 \cdot (q1_i - p1_i) + 8) >> 4$ The decision on whether a weak filter operation should be performed at all or not may also be performed based on the first threshold value $t_{c1}$. In particular, the filtering is only applied if $|\Delta| < 10 \cdot t_{c1}$ Otherwise, no filtering is applied for the line i. In case it is decided to apply a weak deblocking filter, the pixels on the block boundary p0′$_i$ and q0′$_i$ are filtered. According to this embodiment of the present disclosure, the second value of the threshold $t_{c2}$ is used for performing the filtering. The filtering may be performed as follows:

$p0'_i = \text{Clip}(p0_i + \Delta_1)$, and/or $q0'_i = \text{Clip}(q0_i + \Delta_1)$.

After filtering of the pixels at the boundary of the two blocks A and B, it may be decided whether filtering should also be applied to the second nearest pixels p1'$_i$ and q1'$_i$ from the boundary of the respective blocks A and B. In particular, these two pixels are filtered only if $$d_p<(\beta/6) \text{ and } d_q<(\beta/6)$$

respectively.

If it is decided to filter pixel p1'$_i$, then it is filtered by using the second threshold value t$_{c2}$ since the second threshold value controls the filtering operations and has influence on the objective quality by having an effect on the clopping. The filtering may be performed as follows:

$$\Delta_{2p}=\text{Clip3}(-(t_{c2}>>1),(t_{c2}>>1),(((p2_i+p0_i+1)>>)-p1_i+\Delta_1)>>1)$$

$$p1'_1=\text{Clip}(p1_i+\Delta_{2p})$$

Similarly, if it is decided that the pixel q1'$_i$ is to be filtered, then the filtering may be performed as:

$$\Delta_{2q}=\text{Clip3}(-(t_{c2}>>1),(t_{c2}>>1),(((q2_i+q0_i+1)>>1)-q1_i-\Delta_1)>>1)$$

$$q1'_i=\text{Clip}(q1_i+\Delta_{2q})$$

Accordingly, the second parameter (threshold) t$_{c2}$ is used in filtering operation. In particular, the second parameter controls the maximum (upper) and minimum (lower) clipping values (a, b, of the clip3 operation as shown above). Parameters t$_{c2}$ and t$_{c1}$ are determined independently from each other and separately and may thus differ in value as shown above.

Advantageously; the strong filtering also depends on a threshold value t$_{c3}$ as shown below:

$$p0'_i=\text{Clip}(p0_i+\text{Clip3}(-t_{c3},t_{c3},(p2_i+2\cdot p1_i-6\cdot p0_i+2\cdot q0_i+q2_i+4)>>3))$$

$$p1'_i=\text{Clip}(p1_i+\text{Clip3}(-t_{c3},t_{c3},(p2_i-3\cdot p1_i+p0_i+q0_i+2)>>2))$$

$$p2'_i=\text{Clip}(p2_i+\text{Clip3}(-t_{c3},t_{c3},(2\cdot p3_i-5\cdot p2_i+p1_i+p0_i+q0_i+4)>>3))$$

$$q0'_i=\text{Clip}(q0_i+\text{Clip3}(-t_{c3},t_{c3},(q2_i+2\cdot q1_i-6\cdot q0_i+2\cdot p0_i+p2_i+4)>>3))$$

$$q1'_i=\text{Clip}(q1_i+\text{Clip3}(-t_{c3},t_{c3},(q2_i-3\cdot q1_i+q0_i+p0_i+2)>>2))$$

$$q2'_i=\text{Clip}(q2_i+\text{Clip3}(-t_{c3},t_{c3},(2\cdot q3_i-5\cdot q2_i+q1_i+q0_i+p0_i+4)>>3))$$

The third parameter t$_{c3}$ controls thus filtering operation of the "strong filter", i.e. filter applied to three boundary-nearest samples (pixels) in the block. In particular, the filtering is controlled by setting the upper and lower clipping threshold (−tc3, tc3) when calculating the offset added to the filtered sample. This offset is calculated as a weighted sum of surrounding pixels in block A and B offset by a predetermined value and shifted by a predetermined number of bits.

The third threshold value t$_{c3}$ may be equal to the threshold value t$_{c2}$. Both thresholds control the objective quality by directly impacting the filtering operation. However, the third value t$_{c3}$ may also be determined independently from threshold values t$_{C1}$ and t$_{C2}$, coded and embedded into the bit stream at the slice level or at another level such as frame level, block level or each of several frames.

The employing of different thresholds t$_{c1}$ and t$_{c2}$ provides the advantage of increased coding efficiency. These thresholds may be rate distortion optimized by the use of tc$_{offset,coded}$ and tc$_{offset2,coded}$.

Figure 11:
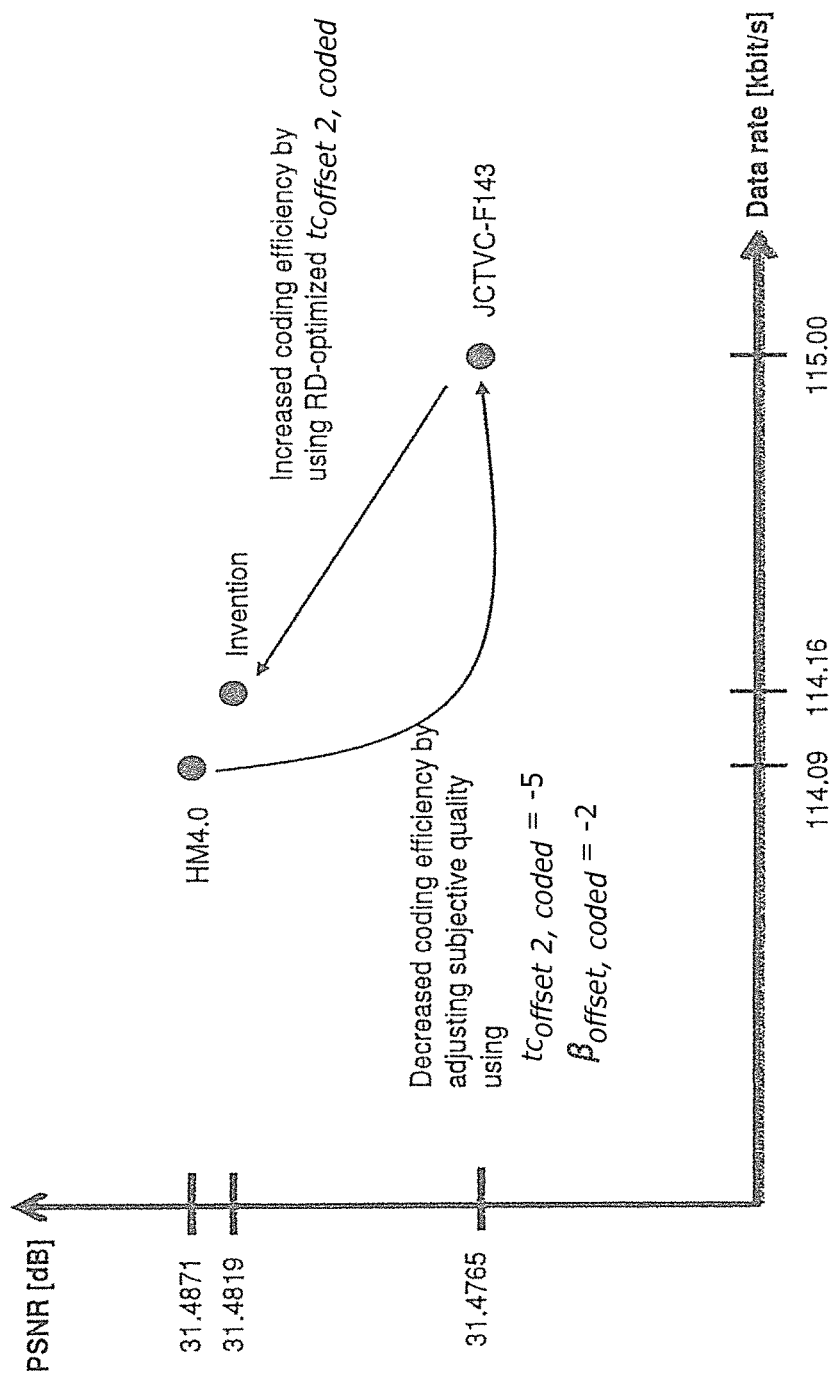
FIG. 11 is a graph illustrating results achieved by an embodiment of the present disclosure, compared to the state of the art.

FIG. 11 illustrates the increased coding efficiency when two thresholds are applied in accordance with an embodiment of the present disclosure compared to the coding efficiency of the HM4.0 and JCTVC-F143. This figure illustrates the peak signal to noise ratio in dB as a function of the data rate. In order to get these results, video sequence "basketball-pass" has been compressed by using quantization parameter with value QP=37 with a prediction structure of low delay and high efficiency. The coding efficiency of the disclosure has been evaluated for an intra-only configuration, i.e. spatial prediction, based on the coding conditions commonly used in the standardization activities of the ISO and the ITU, see document JCTVC-E700 (http://phenix.int-evry.fr/jct/doc_end_user/current_document.php?id=2454). As can be seen in FIG. 11, the suggestion of JCTVC-F143 decreases the coding efficiency by adjusting the subjective quality using the tc$_{offset}$,coded=−5 and β$_{offset,coded}$=−2. The above described embodiment of the present disclosure enables maintaining the subjective quality, since the first parameter tc1 is set separately from tc2 and may be individually configured. At the same time, the objective image quality is increased by the independent parameter tc2. The parameters tc1 and tc2 differ, as described above, by a configurable offset added before clipping. By using two different offsets obtained by a rate-distortion optimization, the embodiment of the present disclosure thus provides an increased coding efficiency.

The present disclosure is not limited to the example as presented above. In general, individual parameters may be used for each decision operation (decision on whether to apply or not a filter or which filter to apply to particular sample, line, or block) and for each filtering operation.

Individual parameter values enable more flexible adaptation to the image content and characteristics and may lead to a higher coding efficiency. In order to reduce the overhead caused by signalling of the separate and individual parameters used in decision and application of the deblocking filtering, the parameters may be further coded by differential coding or by employing an advantageous entropy coding. For instance, the first offset tc$_{offset,\ coded}$ may be coded explicitly and the remaining offset values (tc$_{offset,\ coded2}$ or possibly tc$_{offset,\ coded3}$ which may be used for calculating tc3 threshold, or any other additional offsets) are coded as a difference to the first offset or as mutual differences.

Alternatively, the threshold value t$_c$ may be determined as follows:

$$i_{tc}=\text{Clip3}(0,QP_{Max}+4,QP+tc_{offset})$$

$$t_c=(tc\text{table}[i_{tc}]+tc_{offset,coded})\cdot \text{bitdepthscale}$$

Accordingly, an additional offset is added to the value of the tctable directly. This offset may be coded and transmitted within the slice header. Similarly to the examples above, the table offset may be determined individually and separately for the filter decisions (strong/weak) and for the filtering operation (for instance, controlling the clipping). This additional offset enables finer adjusting of the t$_C$ value, since it also allows values higher than 14 when the example values of tctable listed above are assumed.

In a similar way, a finer adaptation for the threshold value β may be performed as follows:

$$i_\beta=\text{Clip3}(0,QP_{Max},QP),$$

$$\beta=(\beta_{offset,coded}+\text{betatable}[i_\beta])\cdot \text{bitdepthscale}.$$

With this additional offset $\beta_{offset,coded}$ finer adjusting may be achieved since also additional values such as $\beta$=55 are possible, when the example values of betatable listed above are assumed.

It is noted that the above examples are not to limit the present disclosure to this particular filtering stages. For instance, the above examples were described mainly with regard to typical filtering of luminance samples. However, the present disclosure is also applicable to filtering as applied to chrominance samples, for instance, filtering without performing decision whether to filter a particular line of a block or not. The idea of the above embodiment is to enable separate controlling of subjective and objective quality. In particular, high-level parameters are used to separately and individually control decision on whether to apply or not a deblocking filter and the filtering operation itself by controlling operations involved therein such as clipping. This idea may be applied only to some of the above described stages. It is not limited to the particular filtering of HEVC, with help of which, the above examples were described.

In the following further embodiments of the disclosure are summarized: a method for deblocking filtering of a sample in a current block of an image, the method comprising the steps of: determining a sample modification parameter by: calculating a weighted sum of adjacent samples at the boundary between a current block and its neighboring block, the samples forming a line of samples, adding an offset to the weighted sum, and shifting the offset weighted sum right by a predetermined number of bits, wherein the value of the offset depends on the value of the weighted sum; applying the deblocking filter to the sample including offset by the sample modification parameter.

Advantageously, the offset has a first value when the weighted sum is positive and a second value, different from the first value when the weighted sum is negative; and the first and the second value are determined in such a way that the mean of the weighted sum equals to the mean of the sample modification parameter shifted left by the said predetermined number of bits. In particular, the predetermined number of bits is 4, the first value is 6 and the second value 9 or the first value is 7 and the second value is 8; or the predetermined number of bits is 3, the first value is 2 and the second value 5; or the predetermined number of bits is 1, the first value is 0 and the second value 1.

The method may further include calculating a filtering parameter by clipping the absolute value of the sample modification parameter to a clipping value; and filtering said sample including adding to it the filtering parameter, wherein the sample modification and the filtering parameters are calculated by the following steps: calculating the weighted sum; when the weighted sum is greater than zero, the weighted sum is offset by the first value and shifted by the predetermined number of bits to obtain the sample modification parameter; and when the sample modification parameter is larger than the clipping value, the filtering parameter is obtained by clipping the sample modification parameter to the clipping value, otherwise the filtering parameter equals to the sample modification parameter, when the weighted sum is not greater than zero, the weighted sum is offset by the second value and shifted by the predetermined number of bits to obtain the sample modification parameter; and when the sample modification parameter is smaller than the negative clipping value, the filtering parameter is obtained by clipping the sample modification parameter to the negative clipping value, otherwise the filtering parameter equals to the sample modification parameter.

The method may further include a step of judging whether a deblocking filter is to be applied to the sample of the current block at the boundary based on the sample modification parameter; and/or applying or not applying the deblocking filter to the sample according to the judging result.

Another embodiment provides a method for deblocking filtering of a sample in a current block of an image, the method comprising the steps of: determining whether a deblocking filter is to be applied to a sample based on comparing of a decision value with a predetermined threshold value; filtering the sample including offsetting it with a sample modification value; calculating the predetermined threshold and the sample modification value including adding an offset to a quantization parameter associated with the sample, wherein the offset is determined separately for calculating the predetermined threshold and for the sample modification value.

Advantageously, the respective offset for calculating the predetermined threshold and the separate offset for calculating the sample modification value are both included into the bitstream of the coded image data.

Another embodiment provides an apparatus for deblocking filtering of a sample in a current block of an image, the apparatus comprising: a calculation unit for determining a sample modification parameter including: a summing unit for calculating a weighted sum of adjacent samples at the boundary between a current block and its neighboring block, the samples forming a line of samples, an adder for adding an offset to the weighted sum, and a shifting unit for shifting the offset weighted sum right by a predetermined number of bits, wherein the value of the offset depends on the value of the weighted sum; and a filtering unit for applying the deblocking filter to the sample including offsetting by the sample modification parameter.

Advantageously, the offset has a first value when the weighted sum is positive and a second value, different from the first value when the weighted sum is negative; and the first and the second value are determined in such a way that the mean of the weighted sum equals to the mean of the sample modification parameter shifted left by the said predetermined number of bits.

In particular, the predetermined number of bits is 4, the first value is 6 and the second value 9 or the first value is 7 and the second value is 8; or the predetermined number of bits is 3, the first value is 2 and the second value 5; or the predetermined number of bits is 1, the first value is 0 and the second value 1.

Advantageously, the calculation unit is configured to calculate a filtering parameter by clipping the absolute value of the sample modification parameter to a clipping value; and filtering said sample including adding to it the filtering parameter, wherein the calculation unit is configured to calculate the sample modification and the filtering parameters as follows: calculating the weighted sum by the summing unit; when the weighted sum is greater than zero, the adder is configured to offset the weighted sum by the first value and the shifter is configured to shift the result by the predetermined number of bits to obtain the sample modification parameter; and when the sample modification parameter is larger than the clipping value, the calculation unit is configured to calculate the filtering parameter by clipping the sample modification parameter to the clipping value, otherwise the filtering parameter equals to the sample modification parameter, when the weighted sum is not greater than zero, the adder is configured to offset the weighted sum by the second value and the shifting unit is configured to shift the result by the predetermined number of bits to obtain the sample modification parameter; and when the sample modification parameter is smaller than the negative clipping value, the calculation unit is configured to obtain the filtering parameter by clipping the sample modification parameter to the negative clipping value, otherwise the filtering parameter equals to the sample modification parameter.

Moreover, the apparatus may further include a judging unit for judging whether a deblocking filter is to be applied to the sample of the current block at the boundary based on the sample modification parameter; and/or wherein the filtering unit is configured to apply or not apply the deblocking filter to the sample according to the judging result.

Another embodiments provide an apparatus for deblocking filtering of a sample in a current block of an image, the apparatus comprising: a judging unit for determining whether a deblocking filter is to be applied to a sample based on comparing of a decision value with a predetermined threshold value; a filtering unit for filtering the sample including offsetting it with a sample modification value; a calculation unit for calculating the predetermined threshold and the sample modification value including adding an offset to a quantization parameter associated with the sample, wherein the offset is determined separately for calculating the predetermined threshold and for the sample modification value.

Advantageously, the respective offset for calculating the predetermined threshold and the separate offset for calculating the sample modification value are both included into the bitstream of the coded image data.

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Embodiment 2

The processing described in each of embodiments can be simply Implemented in an independent computer system, by recording, in a recording medium, one or more programs for implementing the configurations of the moving picture encoding method (image encoding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture encoding method (image encoding method) and the moving picture decoding method (image decoding method) described in each of embodiments and systems using thereof will be described. The system has a feature of having an image coding apparatus that includes an image encoding apparatus using the image encoding method and an image decoding apparatus using the image decoding method. Other configurations in the system can be changed as appropriate depending on the cases.

Figure 12:
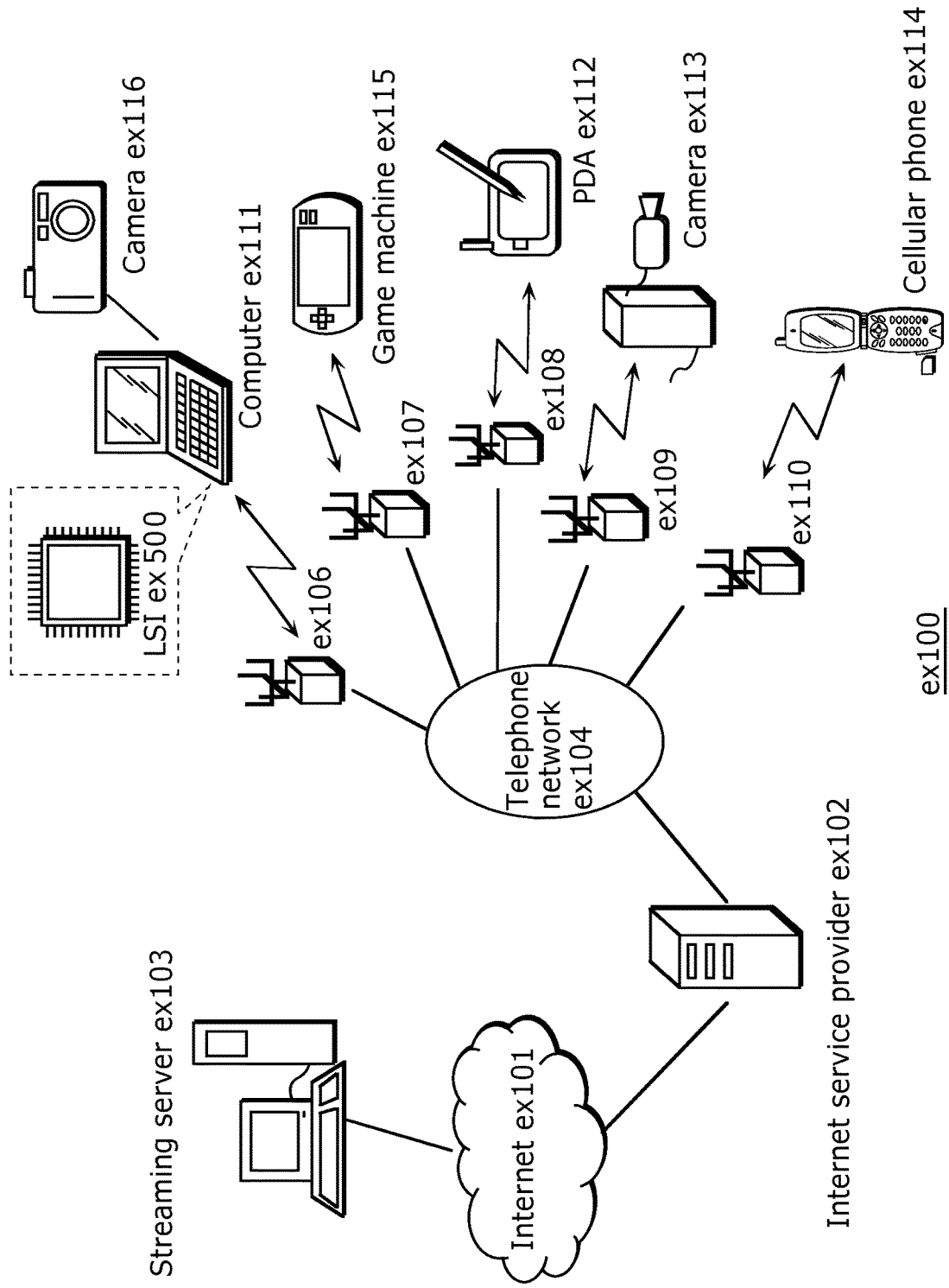
FIG. 12 illustrates an overall configuration of a content providing system for implementing content distribution services.

FIG. 12 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 12, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is encoded as described above in each of embodiments (i.e., the camera functions as the image encoding apparatus according to an aspect of the present disclosure), and the encoded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned encoded data. Each of the devices that have received the distributed data decodes and reproduces the encoded data (i.e., functions as the image decoding apparatus according to an aspect of the present disclosure).

The captured data may be encoded by the camera ex113 or the streaming server ex103 that transmits the data, or the encoding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The encoding processes may be performed by the camera ex116, the computer ex111, or the streaming server ex103, or shared among them.

Furthermore, the coding processes may be performed by an LSI ex500 generally included in each of the computer ex111 and the devices. The LSI ex500 may be configured of a single chip or a plurality of chips. Software for coding video may be integrated into some type of a recording medium (such as a CD-ROM, a flexible disk, and a hard disk) that is readable by the computer ex111 and others, and the coding processes may be performed using the software. Furthermore, when the cellular phone ex114 is equipped with a camera, the video data obtained by the camera may be transmitted. The video data is data encoded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the encoded data in the content providing system ex100. In other words, the clients can receive and decode information transmitted by the user, and reproduce the decoded data in real time in the content providing system ex100, so that the user who does not have any particular right and equipment can implement personal broadcasting.

Figure 13:
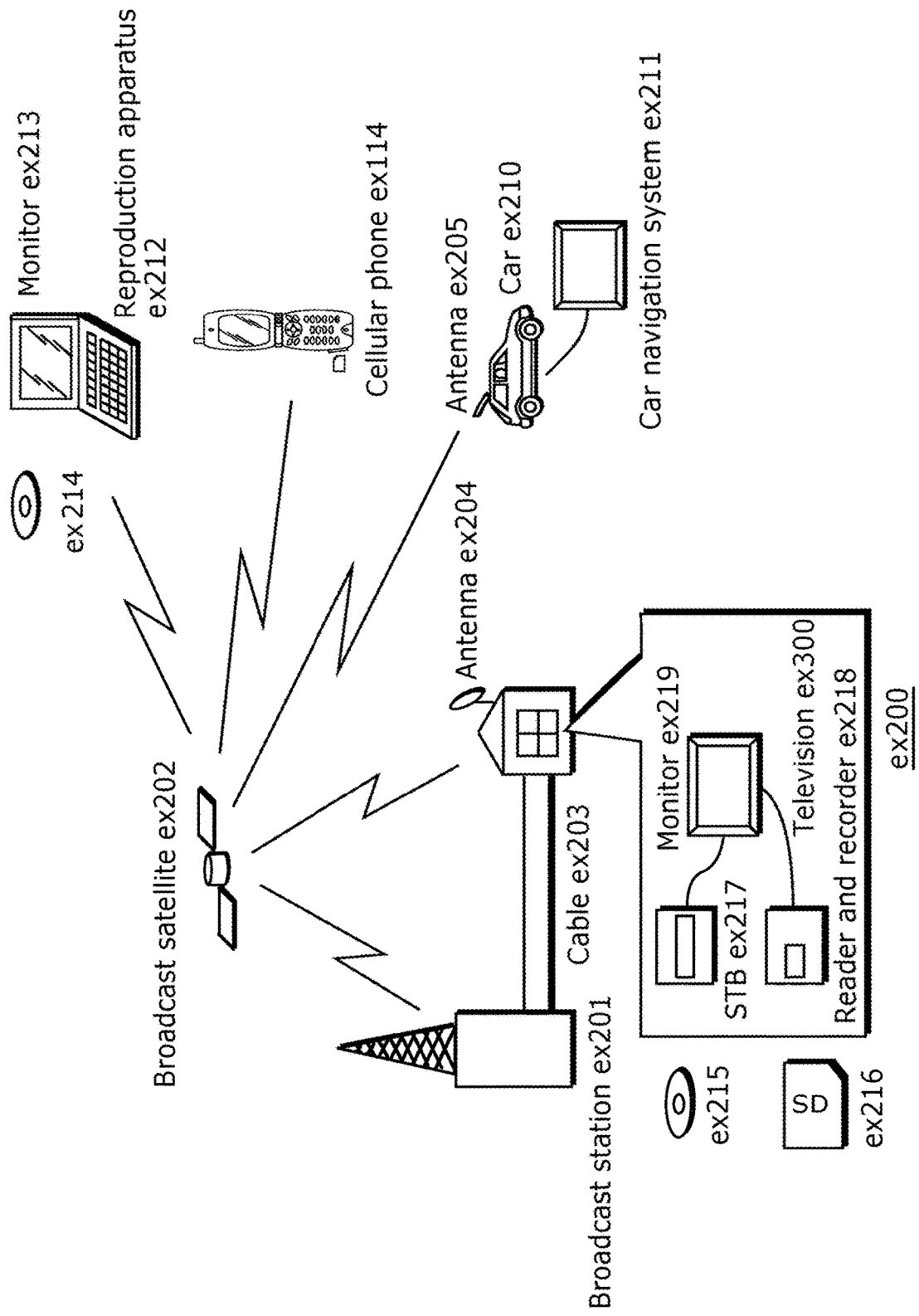
FIG. 13 illustrates an overall configuration of a digital broadcasting system.

Aside from the example of the content providing system ex100, at least one of the moving picture coding apparatus (image coding apparatus) described in each of embodiments may be implemented in a digital broadcasting system ex200 illustrated in FIG. 13. More specifically, a broadcast station ex201 communicates or transmits, via radio waves to a broadcast satellite ex202, multiplexed data obtained by multiplexing audio data and others onto video data. The video data is data encoded by the moving picture encoding method described in each of embodiments (i.e., data encoded by the image encoding apparatus according to an aspect of the present disclosure). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present disclosure).

Furthermore, a reader/recorder ex218 (i) reads and decodes the multiplexed data recorded on a recording medium ex215, such as a DVD and a BD, or (i) encodes video signals in the recording medium ex215, and in some cases, writes data obtained by multiplexing an audio signal on the encoded data. The reader/recorder ex218 can include the moving picture decoding apparatus or the moving picture encoding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 14:
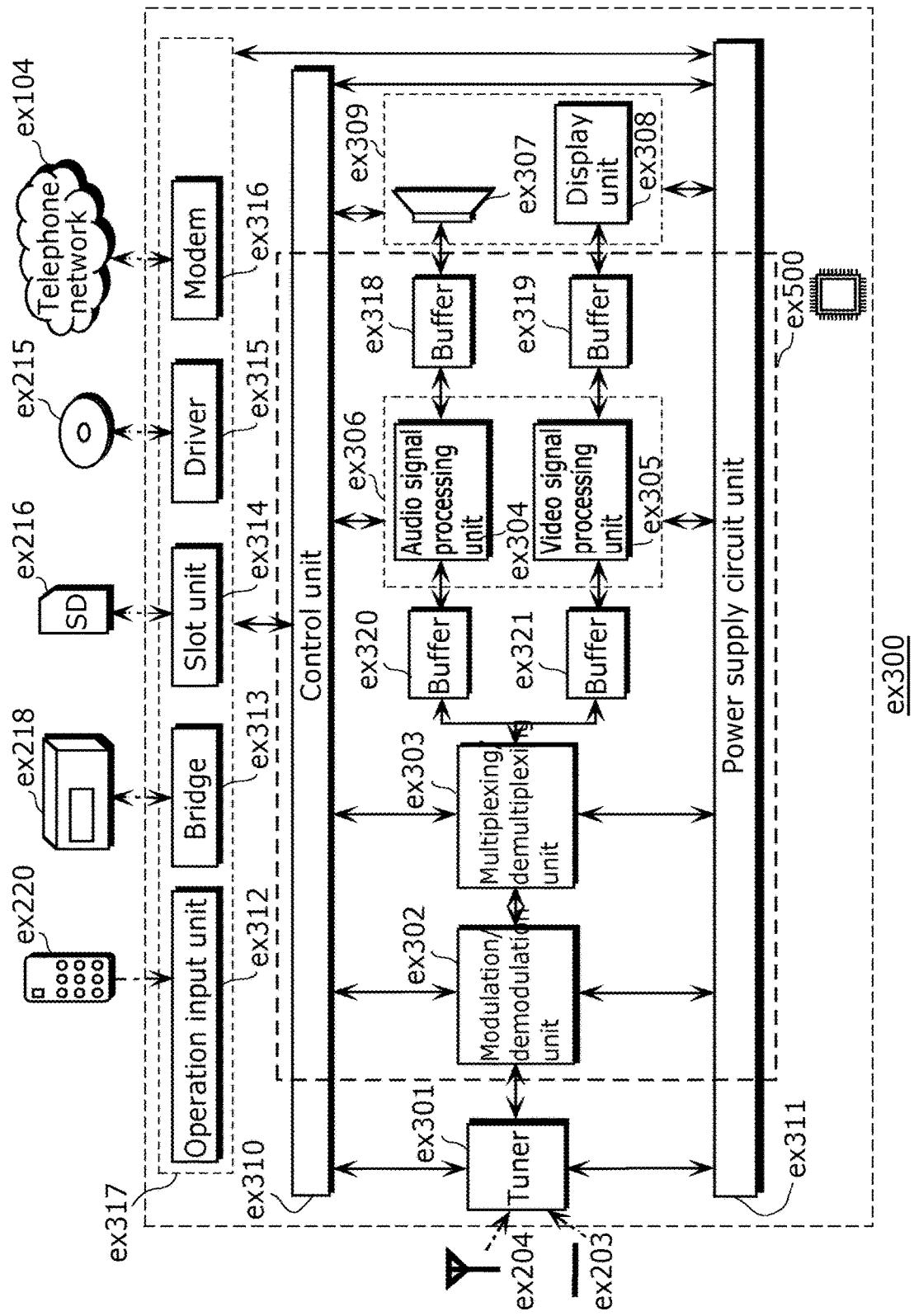
FIG. 14 illustrates a block diagram illustrating an example of a configuration of a television.

FIG. 14 illustrates the television (receiver) ex300 that uses the moving picture encoding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data encoded by a signal processing unit ex306 into data.

The television ex300 further includes: a signal processing unit ex306 including an audio signal processing unit ex304 and a video signal processing unit ex305 that code each of audio data and video data, (which function as the image coding apparatus according to the aspects of the present disclosure); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 encodes an audio signal and a video signal, and transmits the data outside or writes the data on a recording medium will be described. In the television ex300, upon a user operation through the remote controller ex220 and others, the audio signal processing unit ex304 encodes an audio signal, and the video signal processing unit ex305 encodes a video signal, under control of the control unit ex310 using the encoding method described in each of embodiments. The multiplexing/demultiplexing unit ex303 multiplexes the encoded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may encode the obtained data. Although the television ex300 can encode, multiplex, and provide outside data in the description, it may be capable of only receiving, decoding, and providing outside data but not the encoding, multiplexing, and providing outside data.

Furthermore, when the reader/recorder ex218 reads or writes multiplexed data from or on a recording medium, one of the television ex300 and the reader/recorder ex218 may code the multiplexed data, and the television ex300 and the reader/recorder ex218 may share the coding partly.

Figure 15:
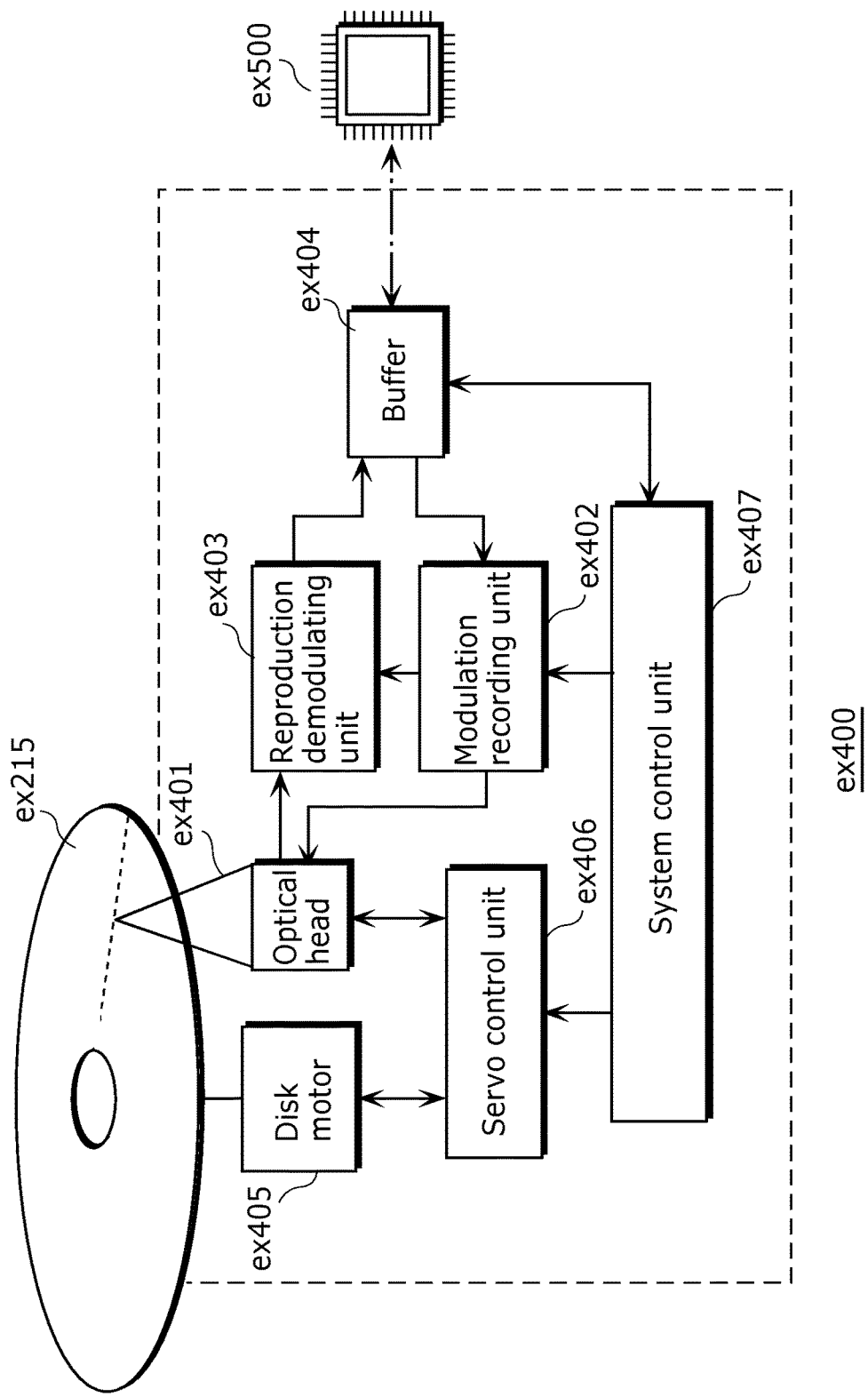
FIG. 15 illustrates a block diagram illustrating an example of a configuration of an information reproducing/recording unit that reads and writes information from and on a recording medium that is an optical disk.

As an example, FIG. 15 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

FIG. 16 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes encoded audio, encoded video data, or multiplexed data obtained by multiplexing the encoded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 14. The same will be true for the configuration of the computer ex111, the cellular phone ex114, and others.

FIG. 17A illustrates the cellular phone ex114 that uses the moving picture coding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded data of the received video, the still pictures, e-mails, or others; and a slot unit ex364 that is an interface unit for a recording medium that stores data in the same manner as the memory unit ex367.

Figure 17B:
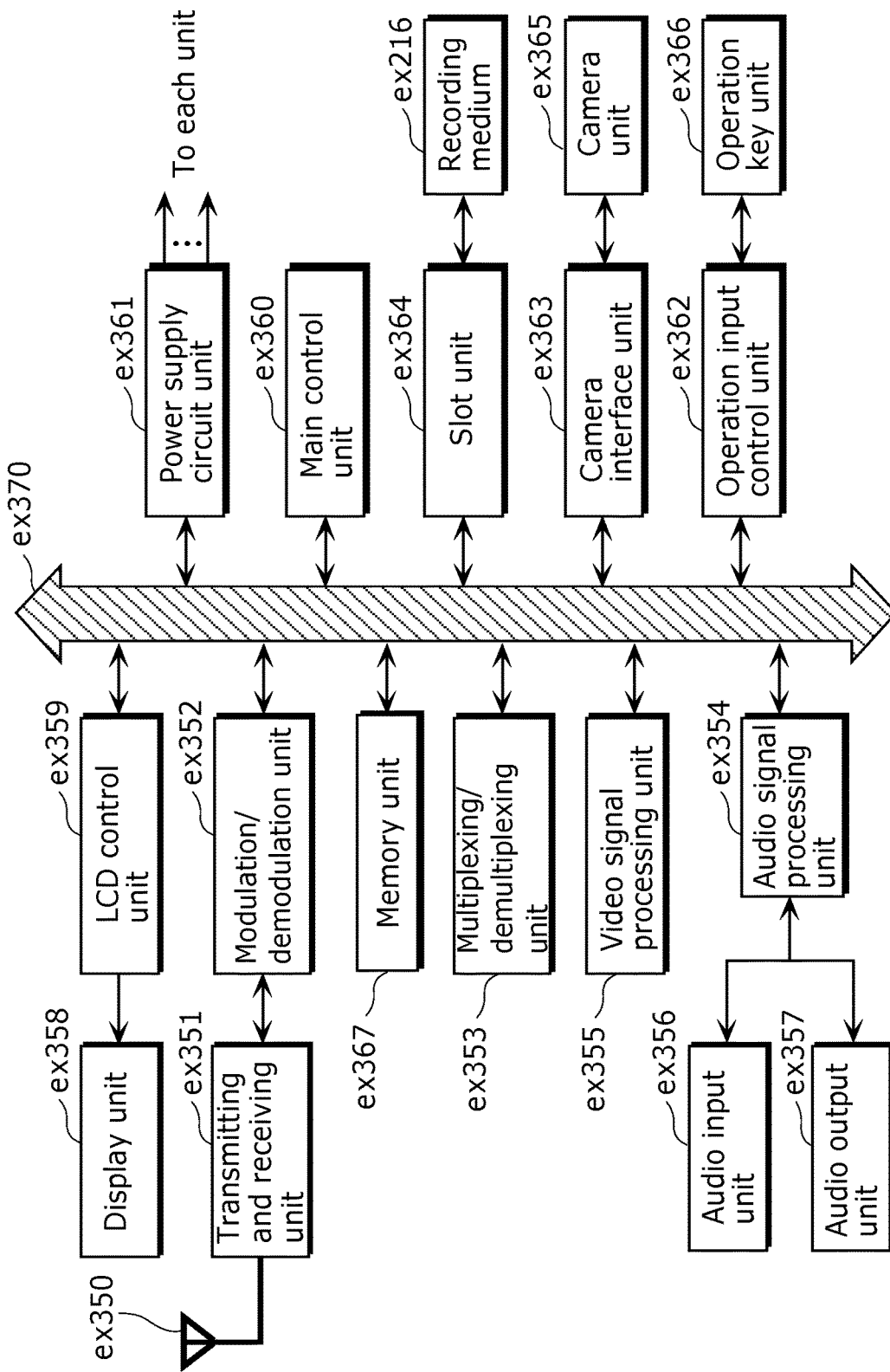
FIG. 17B is a block diagram showing an example of a configuration of a cellular phone.

Next, an example of a configuration of the cellular phone ex114 will be described with reference to FIG. 17B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and encodes video signals supplied from the camera unit ex365 using the moving picture encoding method shown in each of embodiments (i.e., functions as the image encoding apparatus according to the aspect of the present disclosure), and transmits the encoded video data to the multiplexing/demultiplexing unit ex353. In contrast, during when the camera unit ex365 captures video, still images, and others, the audio signal processing unit ex354 encodes audio signals collected by the audio input unit ex356, and transmits the encoded audio data to the multiplexing/demultiplexing unit ex353.

The multiplexing/demultiplexing unit ex353 multiplexes the encoded video data supplied from the video signal processing unit ex355 and the encoded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the encoded video data and the audio signal processing unit ex354 with the encoded audio data, through the synchronous bus ex370. The video signal processing unit ex355 decodes the video signal using a moving picture decoding method corresponding to the moving picture encoding method shown in each of embodiments (i.e., functions as the image decoding apparatus according to the aspect of the present disclosure), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both an encoding apparatus and a decoding apparatus, but also (ii) a transmitting terminal including only an encoding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method in each of embodiments can be used in any of the devices and systems described. Thus, the advantages described in each of embodiments can be obtained.

Furthermore, various modifications and revisions can be made in any of the embodiments in the present disclosure.

Embodiment 3

Video data can be generated by switching, as necessary, between (i) the moving picture encoding method or the moving picture encoding apparatus shown in each of embodiments and (ii) a moving picture encoding method or a moving picture encoding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conforms cannot be detected, an appropriate decoding method cannot be selected.

In view of this, multiplexed data obtained by multiplexing audio data and others onto video data has a structure including identification information indicating to which standard the video data conforms. The specific structure of the multiplexed data including the video data generated in the moving picture encoding method and by the moving picture encoding apparatus shown in each of embodiments will be hereinafter described. The multiplexed data is a digital stream in the MPEG-2 Transport Stream format.

FIG. 18 illustrates a structure of the multiplexed data. As illustrated in FIG. 18, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is encoded in the moving picture encoding method or by the moving picture encoding apparatus shown in each of embodiments, or in a moving picture encoding method or by a moving picture encoding apparatus in conformity with a conventional standard, such as MPEG-2, MPEG-4 AVC, and VC-1. The audio stream is encoded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 19:
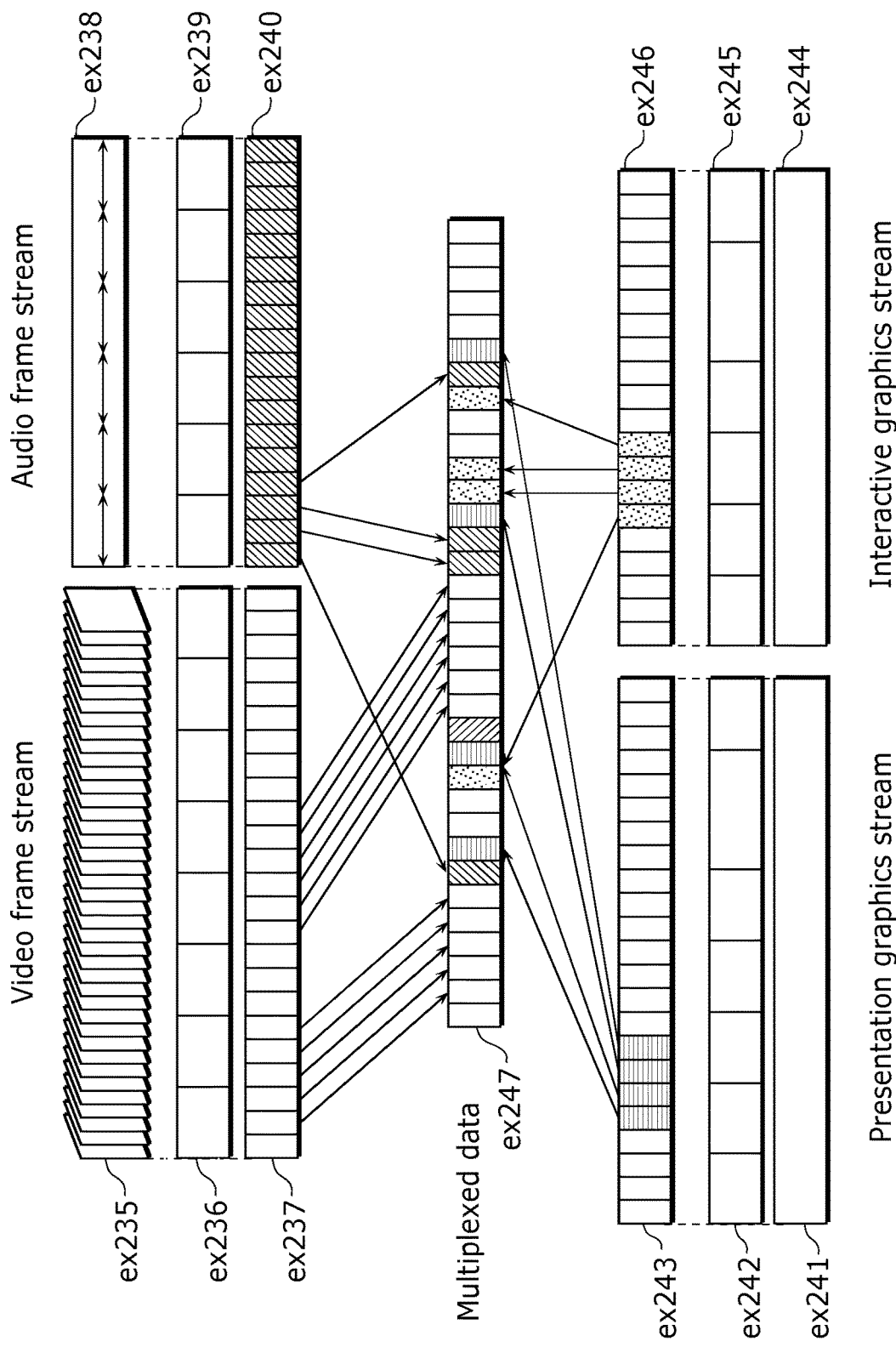
FIG. 19 schematically illustrates how each stream is multiplexed in multiplexed data.

FIG. 19 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 20:
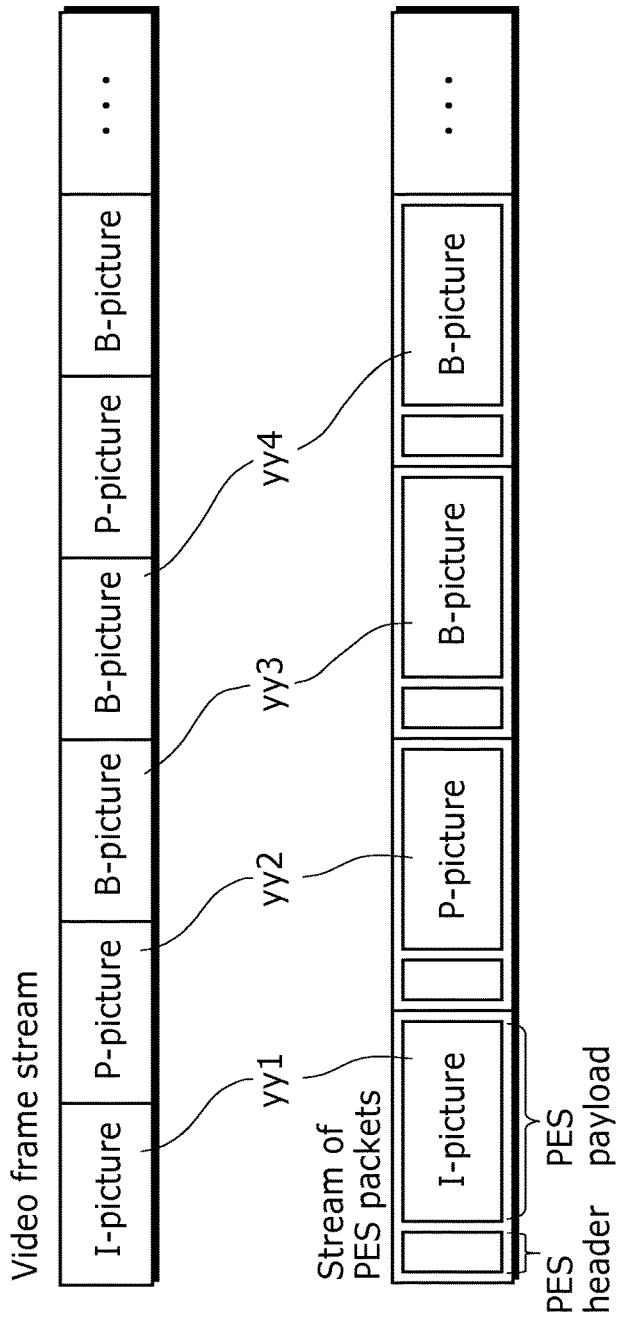
FIG. 20 illustrates how a video stream is stored in a stream of PES packets in more detail.

FIG. 20 illustrates how a video stream is stored in a stream of PES packets in more detail. The first bar in FIG. 20 shows a video frame stream in a video stream. The second bar shows the stream of PES packets. As indicated by arrows denoted as yy1, yy2, yy3, and yy4 in FIG. 20, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 21:
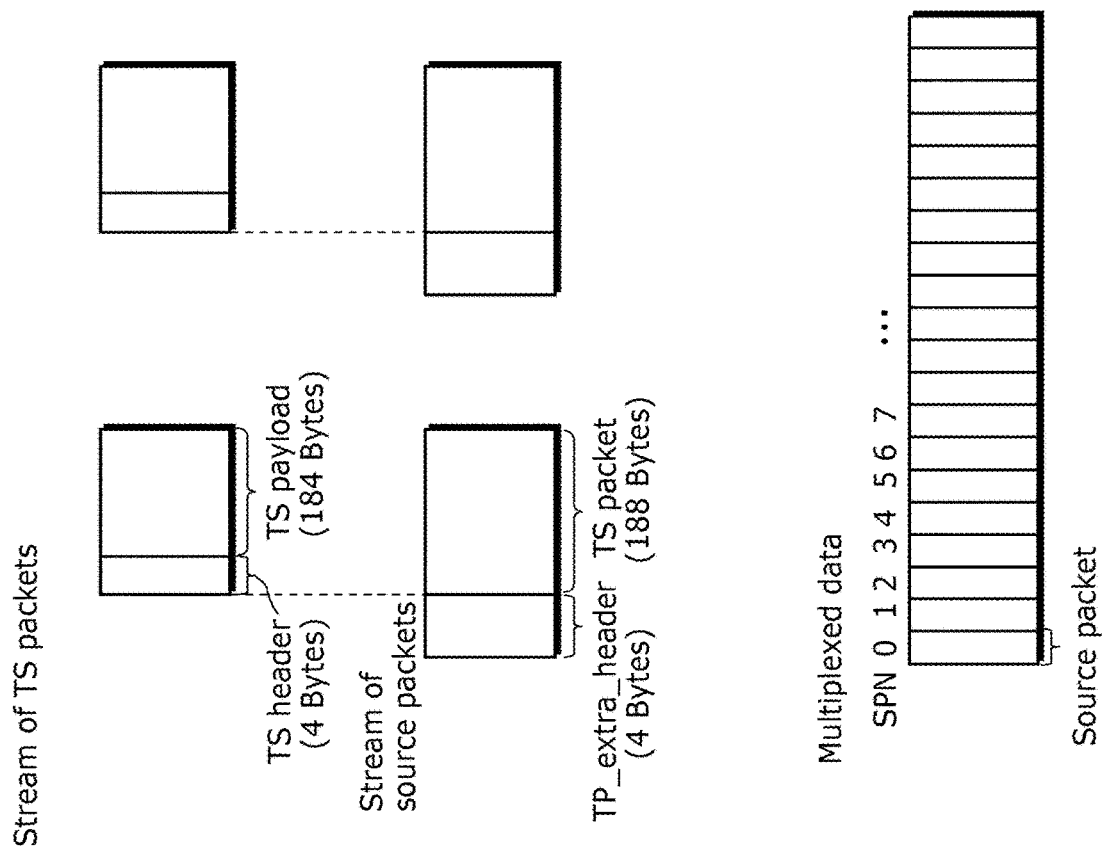
FIG. 21 illustrates a structure of TS packets and source packets in the multiplexed data.

FIG. 21 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 21. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 22:
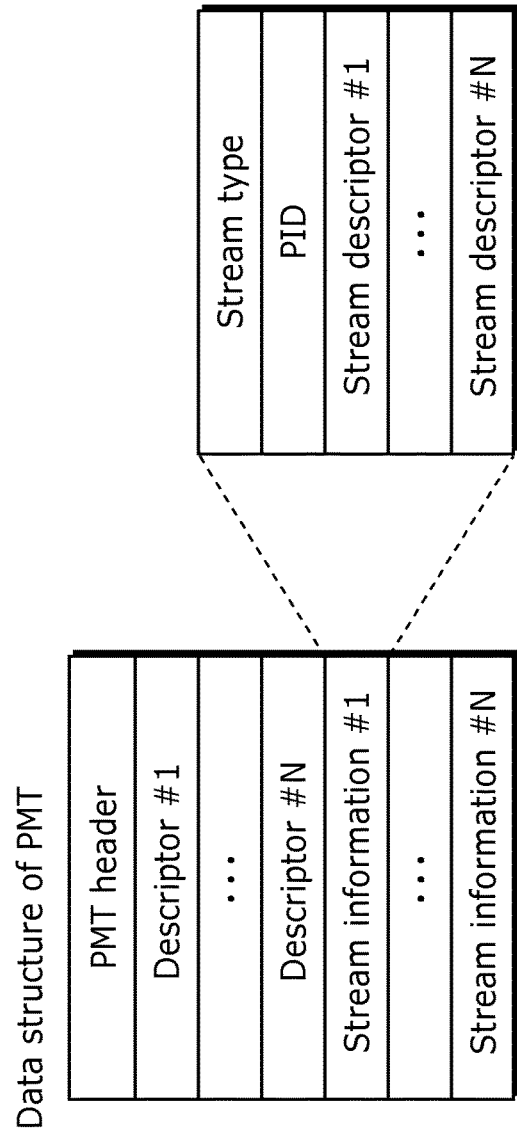
FIG. 22 illustrates a data structure of a PMT.

FIG. 22 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 23:
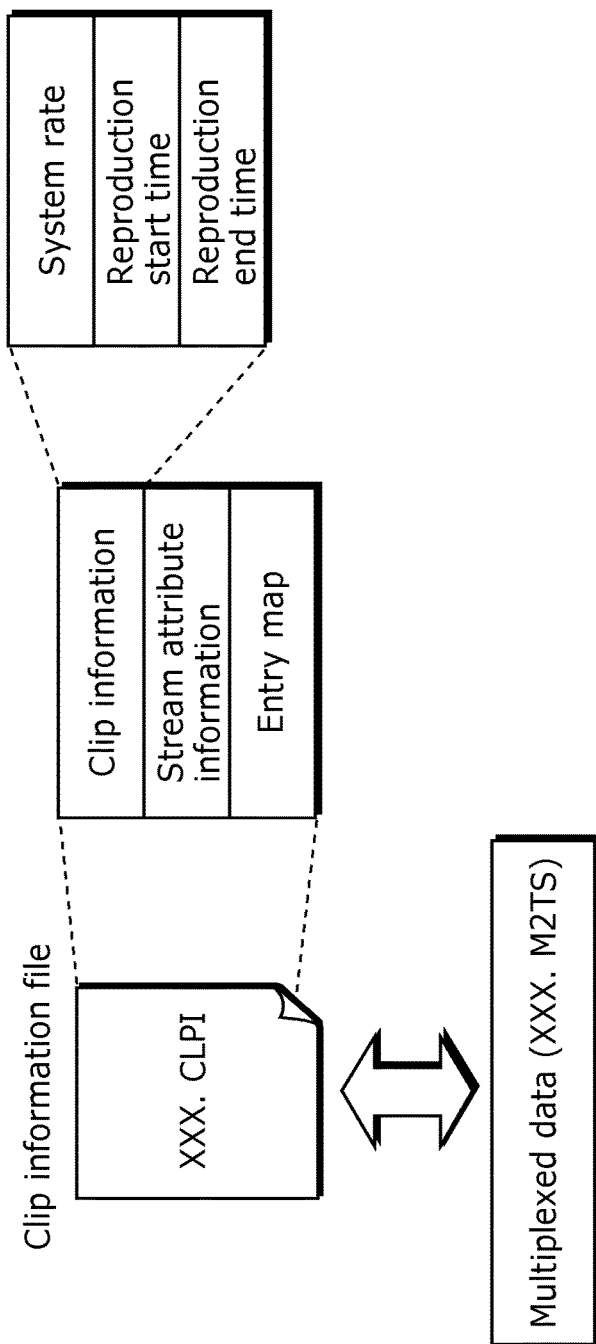
FIG. 23 illustrates an internal structure of multiplexed data information.

Each of the multiplexed data information files is management information of the multiplexed data as shown in FIG. 23. The multiplexed data information files are in one to one correspondence with the multiplexed data, and each of the files includes multiplexed data information, stream attribute information, and an entry map.

As illustrated in FIG. 23, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 24:
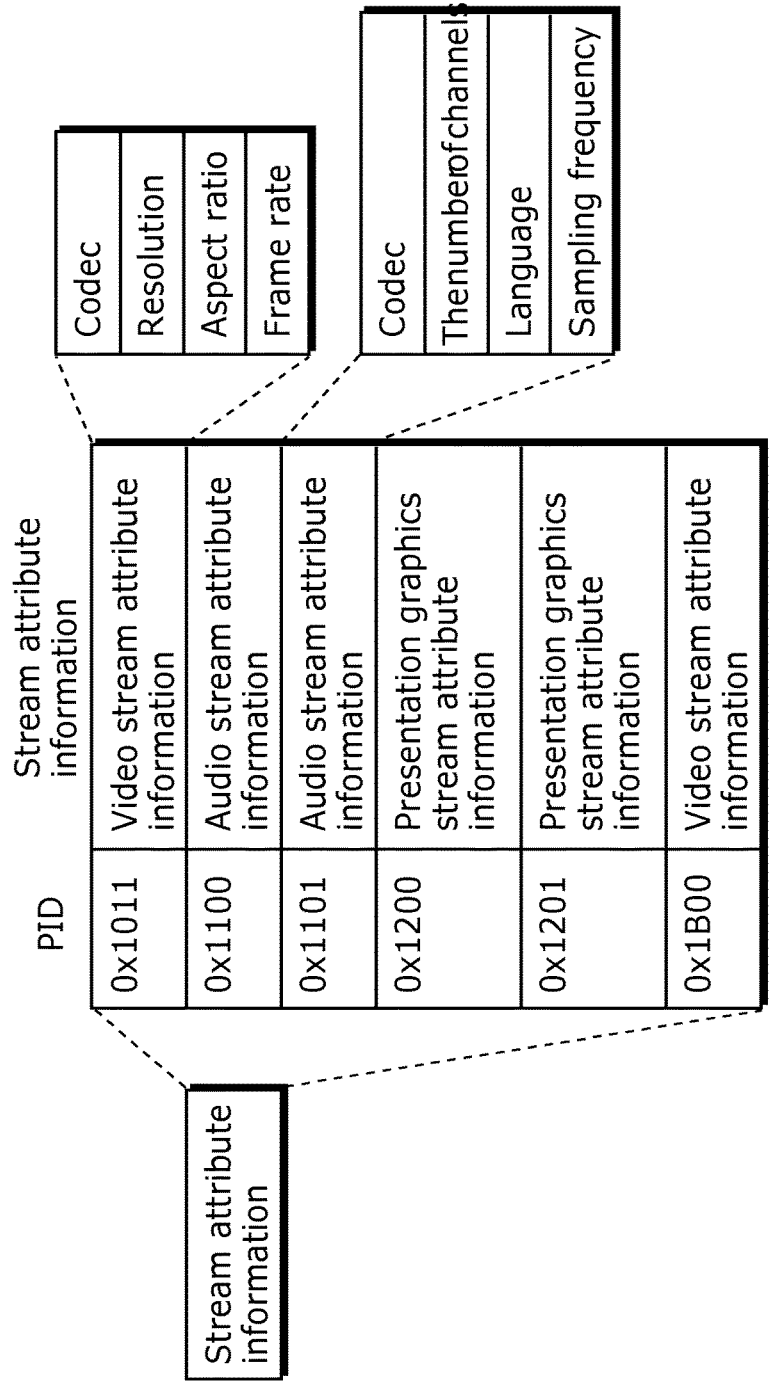
FIG. 24 illustrates an internal structure of stream attribute information.

As shown in FIG. 24, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are Included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture encoding method or the moving picture encoding apparatus described in each of embodiments includes a step or a unit for allocating unique information indicating video data generated by the moving picture encoding method or the moving picture encoding apparatus in each of embodiments, to the stream type included in the PMT or the video stream attribute information. With the configuration, the video data generated by the moving picture encoding method or the moving picture encoding apparatus described in each of embodiments can be distinguished from video data that conforms to another standard.

Figure 25:
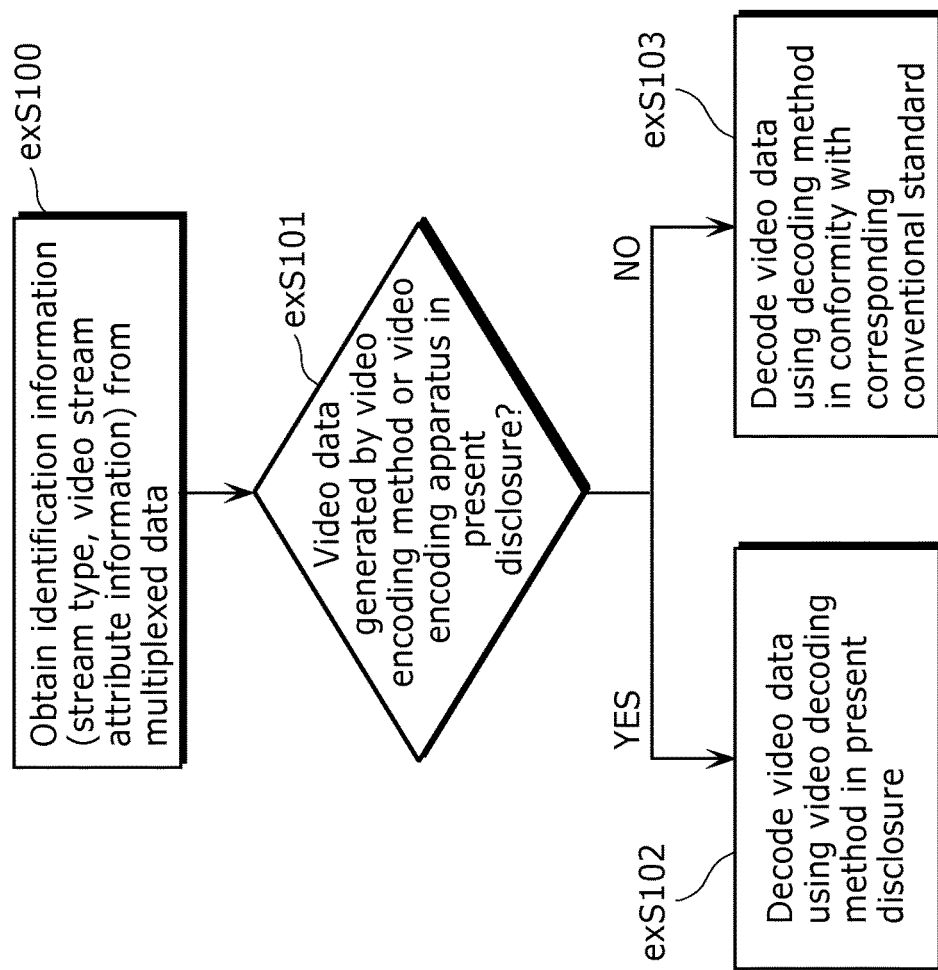
FIG. 25 illustrates steps for identifying video data.

Furthermore, FIG. 25 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture encoding method or the moving picture encoding apparatus in each of embodiments. When it is determined that the stream type or the video stream attribute information indicates that the multiplexed data is generated by the moving picture encoding method or the moving picture encoding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture encoding method or apparatus, or the moving picture decoding method or apparatus in the present embodiment can be used in the devices and systems described above.

Embodiment 4

Figure 26:
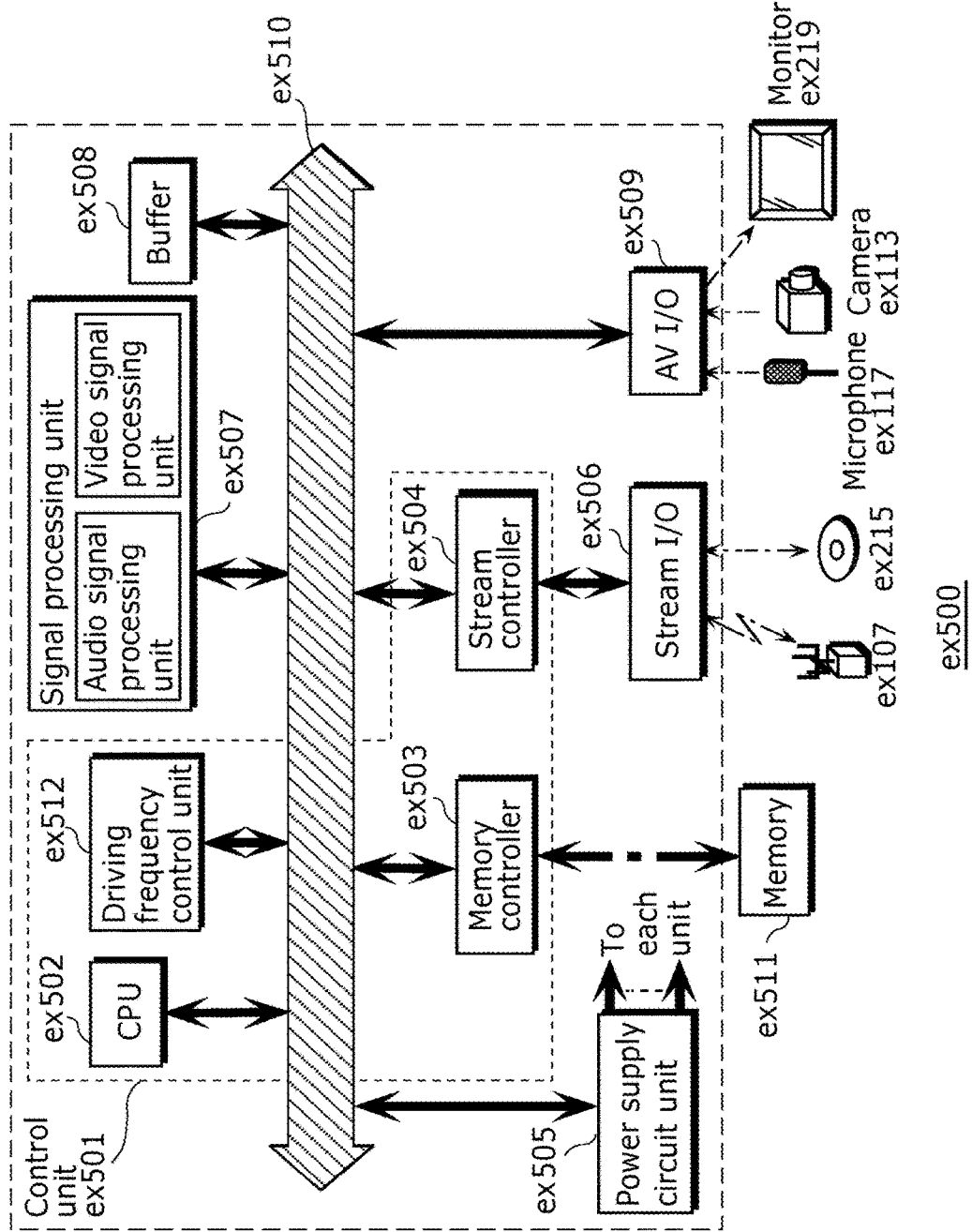
FIG. 26 illustrates an example of a configuration of an integrated circuit for implementing the moving picture coding method according to each of embodiments.

Each of the moving picture coding method and the moving picture coding apparatus in each of embodiments is typically achieved in the form of an integrated circuit or a Large Scale Integrated (LSI) circuit. As an example of the LSI, FIG. 26 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when encoding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 encodes an audio signal and/or a video signal. Here, the encoding of the video signal is the encoding described in each of embodiments. Furthermore, the signal processing unit ex507 sometimes multiplexes the encoded audio data and the encoded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present disclosure is applied to biotechnology.

Embodiment 5

When video data generated in the moving picture encoding method or by the moving picture encoding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, the power consumption increases.

Figure 27:
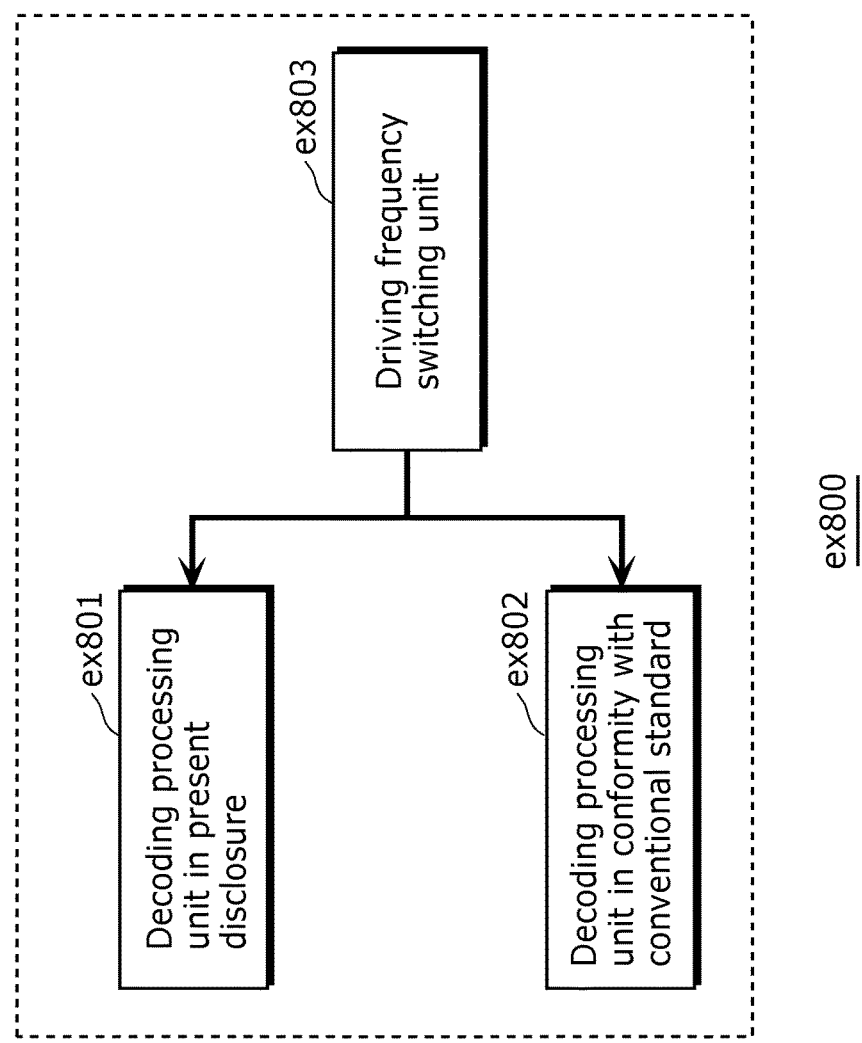
FIG. 27 illustrates a configuration for switching between driving frequencies.

In view of this, the moving picture decoding apparatus, such as the television ex300 and the LSI ex500 is configured to determine to which standard the video data conforms, and switch between the driving frequencies according to the determined standard. FIG. 27 illustrates a configuration ex800 in the present embodiment. A driving frequency switching unit ex803 sets a driving frequency to a higher driving frequency when video data is generated by the moving picture encoding method or the moving picture encoding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture encoding method or the moving picture encoding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 26. Here, each of the decoding processing unit ex801 that executes the moving picture decoding method described in each of embodiments and the decoding processing unit ex802 that conforms to the conventional standard corresponds to the signal processing unit ex507 in FIG. 26. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment B is probably used for identifying the video data. The identification information is not limited to the one described in Embodiment B but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 29. The driving frequency can be selected by storing the look-up table in the buffer ex508 and in an internal memory of an LSI, and with reference to the look-up table by the CPU ex502.

Figure 28:
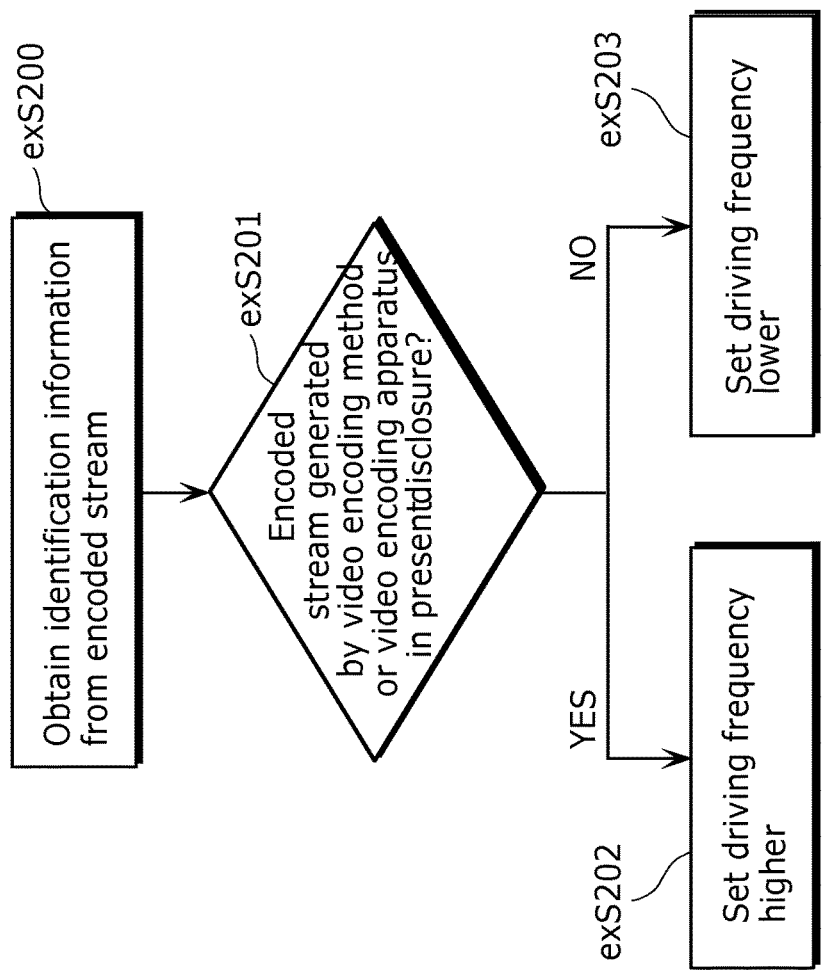
FIG. 28 illustrates steps for identifying video data and switching between driving frequencies.

FIG. 28 illustrates steps for executing a method in the present embodiment. First, in Step exS200, the signal processing unit ex507 obtains identification information from the multiplexed data. Next, in Step exS201, the CPU ex502 determines whether or not the video data is generated by the encoding method and the encoding apparatus described in each of embodiments, based on the identification information. When the video data is generated by the moving picture encoding method and the moving picture encoding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture encoding method and the moving picture encoding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture encoding method and the moving picture encoding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture encoding method and the moving picture encoding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture encoding method and the moving picture encoding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information Indicates that the video data is generated by the moving picture encoding method and the moving picture encoding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 6

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, increase in the scale of the circuit of the LSI ex500 and increase in the cost arise with the individual use of the signal processing units ex507 that conform to the respective standards.

In view of this, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 30A shows an example of the configuration. For example, the moving picture decoding method described in each of embodiments and the moving picture decoding method that conforms to MPEG-4 AVC have, partly in common, the details of processing, such as entropy encoding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing which is unique to an aspect of the present disclosure and does not conform to MPEG-4 AVC. Since the aspect of the present disclosure is characterized by inverse quantization in particular, for example, the dedicated decoding processing unit ex901 is used for inverse quantization. Otherwise, the decoding processing unit is probably shared for one of the entropy decoding, deblocking filtering, and motion compensation, or all of the processing. The decoding processing unit for implementing the moving picture decoding method described in each of embodiments may be shared for the processing to be shared, and a dedicated decoding processing unit may be used for processing unique to that of MPEG-4 AVC.

Furthermore, ex1000 in FIG. 30B shows another example in that processing is partly shared. This example uses a configuration including a dedicated decoding processing unit ex1001 that supports the processing unique to an aspect of the present disclosure, a dedicated decoding processing unit ex1002 that supports the processing unique to another conventional standard, and a decoding processing unit ex1003 that supports processing to be shared between the moving picture decoding method according to the aspect of the present disclosure and the conventional moving picture decoding method. Here, the dedicated decoding processing units ex1001 and ex1002 are not necessarily specialized for the processing according to the aspect of the present disclosure and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present disclosure and the moving picture decoding method in conformity with the conventional standard.

In summary, the present disclosure relates to deblocking filtering which is applicable to smoothing the block boundaries in an image or video coding and decoding. In particular, the deblocking filtering is applied to a sample at a boundary of a block in accordance with a predetermined parameter. The predetermined parameter is used to offset the sample as a part of its filtering. In accordance with the disclosure, this parameter is determined by calculating a weighted sum of the surrounding samples at the boundary, by offsetting it with a value depending on the value of the weighted sum, and by shifting the result by a predetermined number of bits to the right.

The present disclosure relates to deblocking filtering which is applicable to smoothing the block boundaries in an image or video coding and decoding. In particular, the deblocking filtering is either strong or weak, wherein the clipping is performed differently in strong filtering and the weak filtering.

Each of the structural elements in each of the above-described embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory. Here, the software program for realizing the method for deblocking filtering of images according to each of the embodiments is a program described below.

The program causes a computer to execute: judging whether a strong or a weak filter is to be applied; calculating a weighted sum of the sample and adjacent samples at a boundary between the current block and a neighboring block, the samples forming a line of samples; adding an offset to the weighted sum; shifting the offset weighted sum right by a predetermined number of bits; and clipping a result of the shifting, wherein the clipping for strong filtering is controlled by a clipping parameter different from a parameter controlling the clipping for weak filtering.

The herein disclosed subject matter is to be considered descriptive and illustrative only, and the appended Claims are of a scope intended to cover and encompass not only the particular embodiment(s) disclosed, but also equivalent structures, methods, and/or uses.

The invention claimed is:

1. An image decoding method comprising:
  determining, on a per line basis, (i) whether or not a filter is to be applied to a boundary between a block and a neighboring block adjacent to the block, the block and the neighboring block being included in a reconstructed image corresponding to an encoded image, the neighboring block having a prediction signal different from a prediction signal of the block and a transform coefficient different from a transform coefficient of the block and (ii) a width of the filter when the filter is determined to be applied; and
  filtering, on a per line basis, the boundary when the filter is determined to be applied, wherein in the filtering, when the width of the filter is a first width, sample pixels in a second width are used, the first width being narrower than the second width, in the filtering, when the width of the filter is a third width, the third width being narrower than the first width, sample pixels in a fourth width are used, the third width being narrower than the fourth width, in the determining, when determining whether or not the filter is to be applied to a current line, only results of comparing between a value calculated using pixel values and a threshold are used, the pixel values being in the current line and included in the block or the neighboring block, and in calculating the value using the pixel values, a first difference value between p0 and q0 and a second difference value between p1 and q1 are used, p0 and p1 being pixel values of a first pixel and a second pixel respectively in the current line included in the block, and q0 and q1 being pixel values of a third pixel and a fourth pixel respectively in the current line included in the neighboring block, the first pixel being closest to the boundary, the second pixel being next to the first pixel, the third pixel being closest to the boundary, and the fourth pixel being next to the third pixel.

2. An image decoding apparatus comprising:

processing circuitry, and storage coupled to the processing circuitry;

wherein the processing circuitry, by using the storage, performs the following:

determining, on a per line basis, (i) whether or not a filter is to be applied to a boundary between a block and a neighboring block adjacent to the block, the block and the neighboring block being included in a reconstructed image corresponding to an encoded image, the neighboring block having a prediction signal different from a prediction signal of the block and a transform coefficient different from a transform coefficient of the block and (ii) a width of the filter when the filter is determined to be applied; and filtering, on a per line basis, the boundary when the filter is determined to be applied, wherein in the filtering, when the width of the filter is a first width, sample pixels in a second width are used, the first width being narrower than the second width, in the filtering, when the width of the filter is a third width, the third width being narrower than the first width, sample pixels in a fourth width are used, the third width being narrower than the fourth width, in the determining, when determining whether or not the filter is to be applied to a current line, only results of comparing between a value calculated using pixel values and a threshold are used, the pixel values being in the current line and included in the block or the neighboring block, and in calculating the value using the pixel values, a first difference value between p0 and q0 and a second difference value between p1 and q1 are used, p0 and p1 being pixel values of a first pixel and a second pixel respectively in the current line included in the block, and q0 and q1 being pixel values of a third pixel and a fourth pixel respectively in the current line included in the neighboring block, the first pixel being closest to the boundary, the second pixel being next to the first pixel, the third pixel being closest to the boundary, and the fourth pixel being next to the third pixel.

* * * * *